(12) United States Patent
Nakamura

(10) Patent No.: US 12,544,925 B2
(45) Date of Patent: Feb. 10, 2026

(54) ROBOT CONTROL SYSTEM, ROBOT CONTROL METHOD AND PROGRAM

(71) Applicant: HITACHI, Ltd., Tokyo (JP)

(72) Inventor: Satoshi Nakamura, Novi, MI (US)

(73) Assignee: HITACHI, LTD., Tokyo (JP)

( * ) Notice: Subject to any disclaimer, the term of this patent is extended or adjusted under 35 U.S.C. 154(b) by 106 days.

(21) Appl. No.: 18/375,291

(22) Filed: Sep. 29, 2023

(65) Prior Publication Data

US 2025/0108508 A1    Apr. 3, 2025

(51) Int. Cl.
  *B25J 9/16*    (2006.01)

(52) U.S. Cl.
  CPC ........... *B25J 9/1661* (2013.01); *B25J 9/1697* (2013.01)

(58) Field of Classification Search
  CPC ...... B25J 9/1661; B25J 9/1612; B25J 9/1664; B25J 9/1697; B65G 61/00; G05B 19/4155; G05B 2219/40202; G05B 2219/37405; G05B 2219/40113; G05B 2219/40201; G05B 2219/32423; G06N 3/09; G06F 18/2178; G06F 3/0635; G06F 2218/00; G06F 3/017; G06F 3/016
  See application file for complete search history.

(56) References Cited

U.S. PATENT DOCUMENTS

| | | | |
|---|---|---|---|
| 10,899,018 B2 | 1/2021 | Naitou | |
| 2015/0352719 A1 | 12/2015 | Nakazato et al. | |
| 2018/0065256 A1* | 3/2018 | Naitou | F16P 3/12 |
| 2018/0126558 A1 | 5/2018 | Ooba | |
| 2020/0238519 A1* | 7/2020 | Diankov | B25J 9/1697 |
| 2022/0016767 A1* | 1/2022 | Ku | B25J 9/1697 |
| 2022/0274255 A1* | 9/2022 | Okawa | B25J 9/1697 |
| 2022/0297259 A1 | 9/2022 | Wang et al. | |
| 2023/0080565 A1* | 3/2023 | Ogawa | B25J 9/163 |
| | | | 700/245 |
| 2023/0182293 A1* | 6/2023 | Shaw | B25J 15/0616 |
| | | | 700/245 |
| 2023/0294277 A1* | 9/2023 | Yang | G05B 19/4155 |
| | | | 700/217 |

FOREIGN PATENT DOCUMENTS

| | | | |
|---|---|---|---|
| JP | 201858178 A | 4/2018 | |
| JP | 202130407 A | 3/2021 | |
| WO | 2011021376 A1 | 2/2011 | |

OTHER PUBLICATIONS

Office Action issued in Japanese Patent Application No. 2024-130872, dated Oct. 7, 2025, 14 pages.

* cited by examiner

*Primary Examiner* — Abby Lin
*Assistant Examiner* — Kayla R Doros
(74) *Attorney, Agent, or Firm* — PROCOPIO, CORY, HARGREAVES & SAVITCH LLP

(57) ABSTRACT

In example implementations described herein, there are systems and methods for controlling a cooperative robotic device including generating, for the cooperative robotic device, a plurality of candidate task end states associated with a first task. The method may further include selecting, for the cooperative robotic device, a first task end state from the plurality of candidate task end states, receiving load data regarding a load experienced by the cooperative robotic device, and selecting, based on the load data, a second task end state from the plurality of candidate task end states.

20 Claims, 18 Drawing Sheets

| Name | Command | Action | Image |
|---|---|---|---|
| Release | Pull down twice quickly | Release item from end-effector | |
| Stand by | Push twice quickly to opposite with robot moving direction | Slightly back and hold position while a moment | |
| Change goal | Push and pull quickly, then apply force to another goal. | Change goal position | |
| Replan | Push and pull quickly, and push and pull again | Re-plan all: wait a while, then find goal candidate and re-plan motion | |
| ⋮ | ⋮ | ⋮ | ⋮ |

FIG. 15

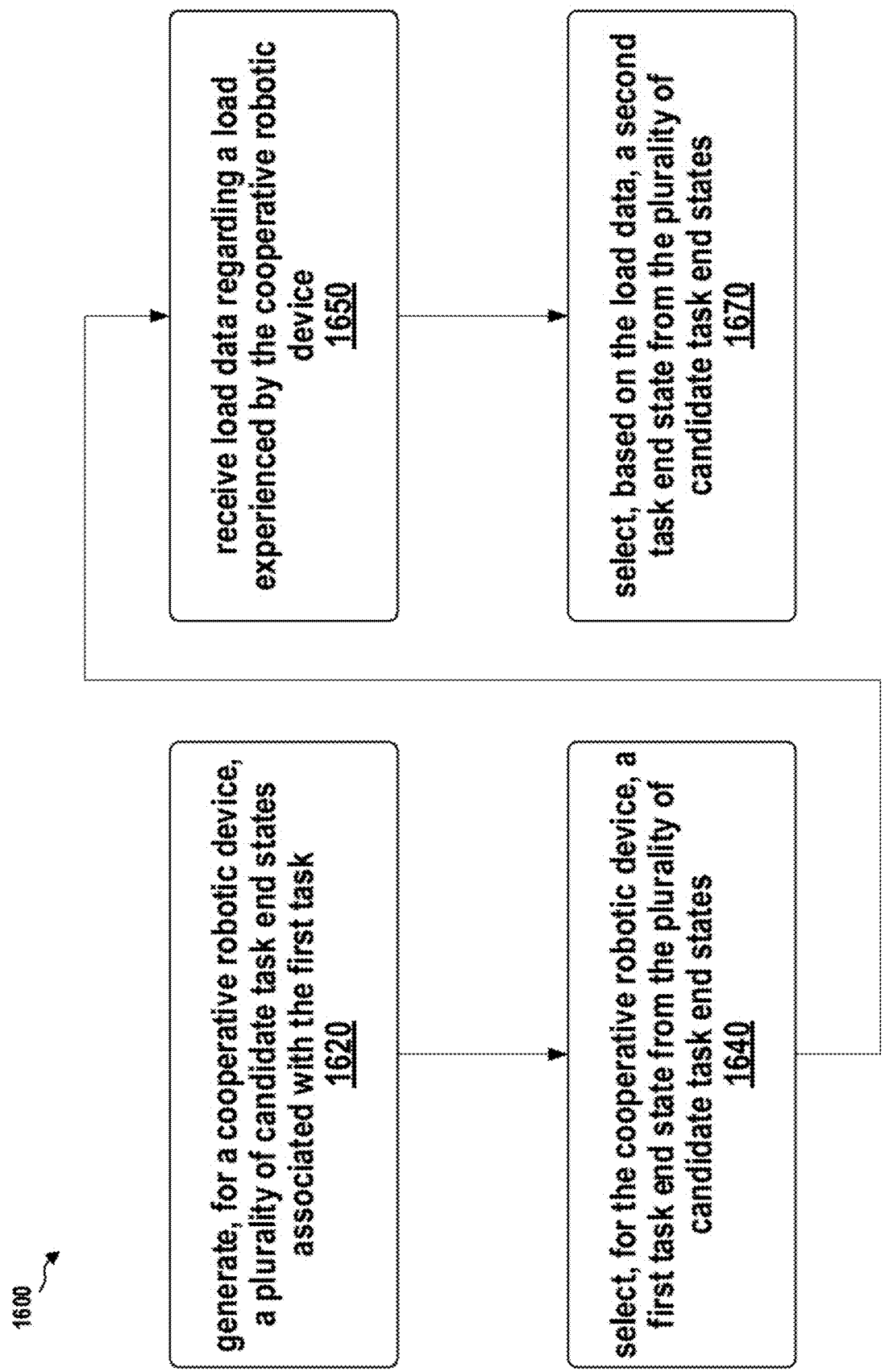

ROBOT CONTROL SYSTEM, ROBOT CONTROL METHOD AND PROGRAM

BACKGROUND

Field

The present disclosure is generally directed to cooperative robotic systems.

Related Art

In the fields of manufacturing and construction, high-mix low-volume production and mass customization, which differ from conventional mass production methods, are attracting attention in order to respond to diversifying customer needs. These methods require frequent adjustments and changes in production volume and processes to meet diverse needs, and therefore companies are seeking personnel who can handle complex and numerous processes (multi-skilled workers) to cope with such situations. On the other hand, the labor shortage has become more serious in recent years, making it more difficult to secure human resources. Therefore, more advanced automation and manpower saving using robots, AI, and other digital tools are required to replace the labor force.

In introducing robots to an actual work site, it is challenging for robots to completely replace human work at the current level of technology, but there are cases where robots can replace the carrying of objects and other relatively simple tasks, allowing people to focus on more complex tasks. In these cases, the human and robot may work more closely together. Traditionally, robots have been used within a range, or area, surrounded by safety fences to prevent people from approaching the robot while it is in operation. However, cooperative robots have become more popular in recent years, and there are more and more use cases where robots operate without safety fences and in positions where they can come into contact with people. However, although current cooperative robots have enhanced safety features to prevent injury when in contact with a person, there are almost no actual examples of cooperative robots that move simultaneously with a person. In practice, there are robot systems that work in the same space as humans, but most of them work sequentially with humans, and there are few examples of work that shares the same time and space, e.g., robots that move while associated human workers move to work together.

When a robot cooperates with a human worker, especially when the human and robot operate simultaneously, the human may take unexpected actions. In this case, existing robots may be configured to execute pre-planned actions, and the robot does not change its actions in response to the cooperative operator's unexpected actions during the moving. Therefore, the robot does not respond to the cooperative operator's actions, and the robot's actions may be inappropriate for the cooperative work, which may interrupt the work and reduce the efficiency of the cooperative work. For example, when the cooperative operator reaches out to pick up a part or tool, the operator's hand or arm may be positioned in the path of the robot, causing the robot to come into contact with the human operator, which may interrupt the work. If the cooperative operator's body position is measured to detect whether the robot is in the robot's path, and if it is detected, the robot's motion is planned again, the work is interrupted during the re-planning process, which reduces the efficiency of the cooperative work. Some robotic systems configure the robot to continue (or begin a new operation/task) based on a specific force pattern applied by the human worker after stopping due to contact with the human worker, however, such a system may reduce the efficiency of a cooperative task since the human worker needs to do perform a particular operation (e.g., apply a specific force pattern) that may not be intuitive or may require additional time after stopping.

For example, conventional robots repeatedly move only to memorized positions, so that the robotic device may be made to perform a task using a motion pattern that specifies positions in accordance with the work content. However, in tasks such as cooperative work with humans (especially for high-mix low-volume production and/or mass customization), the work content changes irregularly and the work object may not be fixed and its position may frequently, or constantly, be changing as it is manipulated by a cooperating human worker. Specifically, for cooperative work with a human worker, it may not be possible to achieve a particular objective (e.g., associated with a pre-defined goal or task) by repeatedly moving to a specified set of positions. Accordingly, a cooperative robotic system should be able to use an environmental measurement device such as a camera or distance measuring device (e.g., RADAR or LIDAR) to recognize the situation around the robot and cooperative operators and/or a sensor that detects external force due to human contact with the robot and to generate an updated goal or task and an associated set of instructions for the robot based on the situation around the robot and cooperative operators and/or the force due to human contact with the robot. However, some previous robotic systems must perform a complete re-evaluation of a goal upon each detected change to the situation or detected force due to human contact and/or rely on additional human input before re-starting or continuing operation. Accordingly, a cooperative robotic system that can respond to each detected change to the situation or detected force due to human contact without a complete re-evaluation may allow more efficient cooperation between a human worker and the cooperative robotic system.

SUMMARY

Example implementations described herein involve an innovative cooperative robotic (or robot) system to perform, and a method to provide, highly efficient cooperative work between the cooperative robotic system and a cooperative operator by appropriately responding to the actions of the cooperative operator (e.g., a human worker) and continuing the cooperative work without interruption. The cooperative robotic system, in some aspects, may include a goal planning module that generates a plurality of robotic task targets (e.g., task goal candidates or candidate task end states associated with one or more work tasks or objectives) for a robot of the cooperative robotic system before the robot executes a particular task of the plurality of robotic task targets). The cooperative robotic system, in some aspects, may also include a load estimation module that detects the load situation of the robot (e.g., a current and/or historical magnitude and direction of a load applied to the robot). The cooperative robotic system, in some aspects, may further include a motion planning module that selects one of the robotic task targets based on the robot's load situation and plans the robot's motion associated with the selected robotic task target. The goal planning module, in some aspects, determines multiple candidate goals (goal states) according to the work content during preliminary motion planning, and scores each candidate goal. The load estimation module may detect the robot's load status while the robot executes the motion associated with the selected robotic task target. Based on the detected load status, the motion planning module may update a robotic task target selection to change a robotic task target or selecting one of the multiple robotic task targets (associated with the one or more work tasks or objectives) based on scores calculated for, or associated with, the multiple robotic task targets (e.g., candidate task end states associated with one or more work tasks or objectives) and the detected load status (or situation). The motion planning module, in some aspects, may generate a set of instructions for executing the motion corresponding to the updated (newly-selected) robotic task target selection and providing the set of instructions to a robot of the cooperative robotic system.

Aspects of the present disclosure include a method of controlling a cooperative robotic device including generating, for the cooperative robotic device, a plurality of candidate task end states associated with a first task. The method may further include selecting, for the cooperative robotic device, a first task end state from the plurality of candidate task end states, receiving load data regarding a load experienced by the cooperative robotic device, and selecting, based on the load data, a second task end state from the plurality of candidate task end states.

Aspects of the present disclosure include a non-transitory computer readable medium, storing instructions for execution by a processor, which can involve instructions for controlling a cooperative robotic device including instructions for generating, for the cooperative robotic device, a plurality of candidate task end states associated with a first task. The instructions may further include instructions for selecting, for the cooperative robotic device, a first task end state from the plurality of candidate task end states, receiving load data regarding a load experienced by the cooperative robotic device, and selecting, based on the load data, a second task end state from the plurality of candidate task end states.

Aspects of the present disclosure include a system, which can involve means for controlling a cooperative robotic device including means for generating, for the cooperative robotic device, a plurality of candidate task end states associated with a first task. The system may further include means for selecting, for the cooperative robotic device, a first task end state from the plurality of candidate task end states, means for receiving load data regarding a load experienced by the cooperative robotic device, and means for selecting, based on the load data, a second task end state from the plurality of candidate task end states Aspects of the present disclosure include an apparatus, which can include a memory and at least one processor coupled to the at least one memory and, based at least in part on information stored in the at least one memory, the at least one processor, individually or in any combination, may be configured to generate, for the cooperative robotic device, a plurality of candidate task end states associated with a first task. The at least one processor may further be configured to select, for the cooperative robotic device, a first task end state from the plurality of candidate task end states, receive load data regarding a load experienced by the cooperative robotic device, and select, based on the load data, a second task end state from the plurality of candidate task end states.

BRIEF DESCRIPTION OF DRAWINGS

FIG. 15 is a list of examples of load patterns that may be used in some aspects of the disclosure to modify and/or update task goals.

FIG. 16 is a flow diagram illustrating a method in accordance with some aspects of the disclosure.

DETAILED DESCRIPTION

Figure 1:
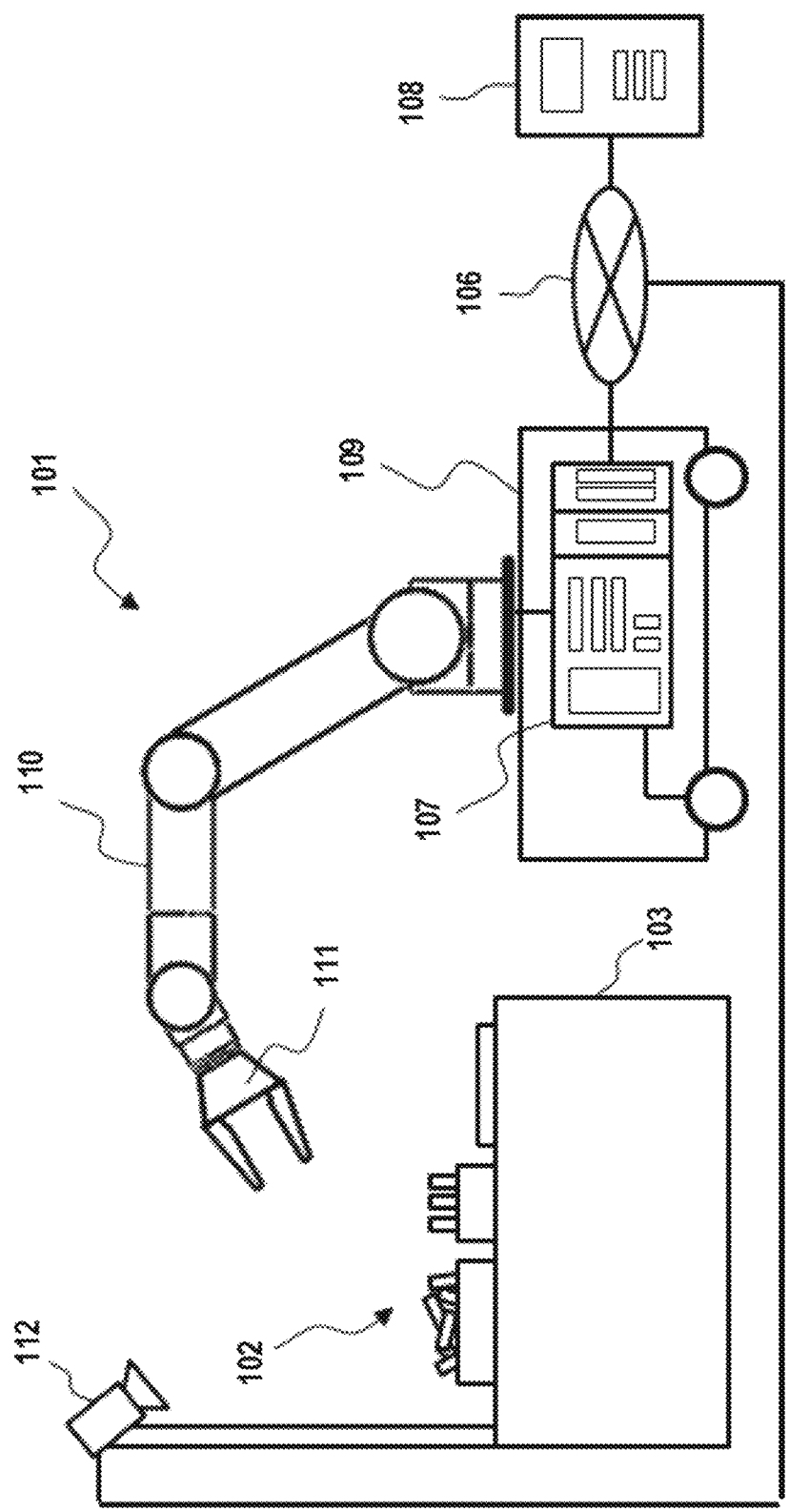
FIG. 1 illustrates components associated with a cooperative robotic system in accordance with some aspects of the disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 2:
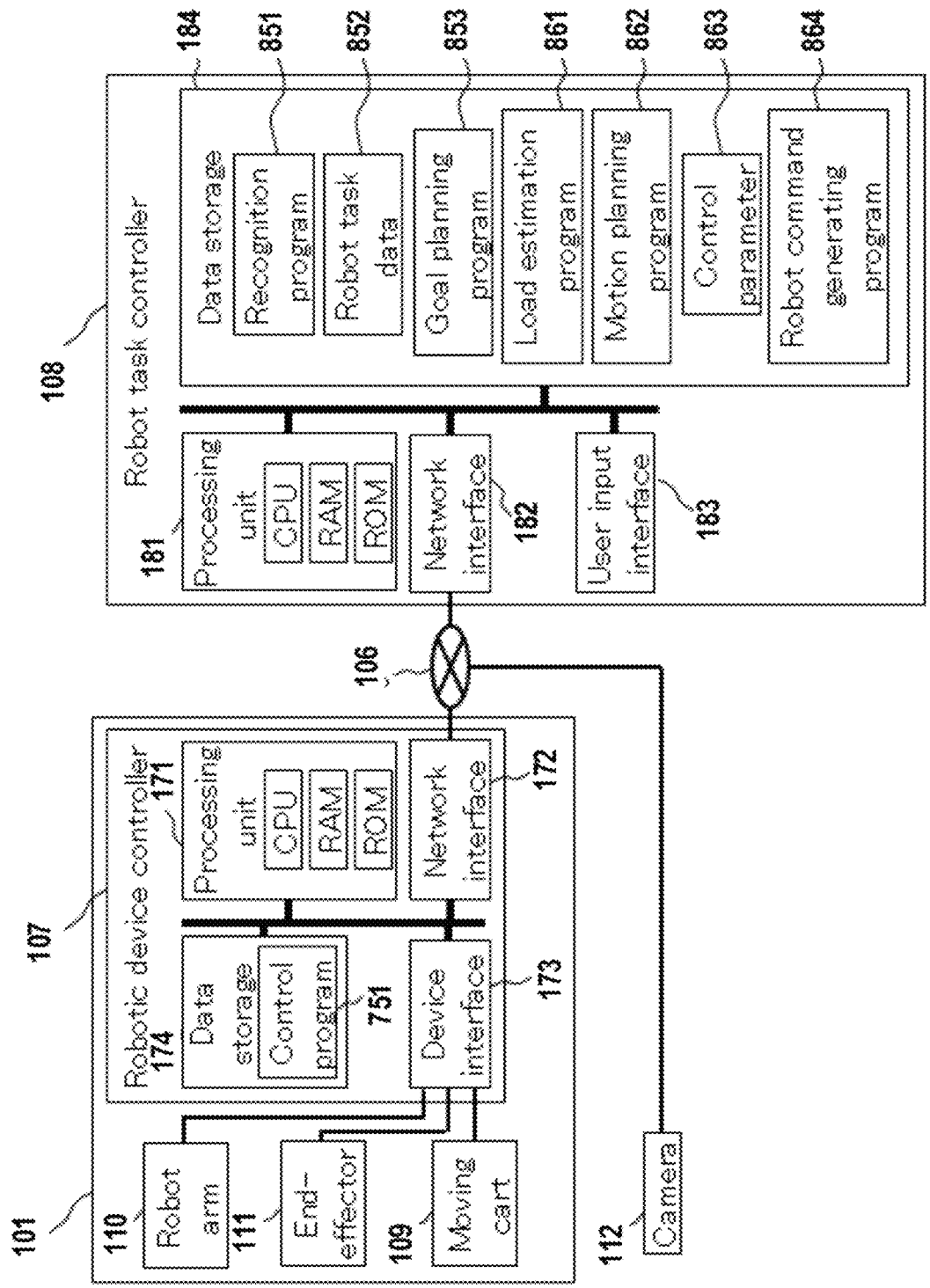
FIG. 2 illustrates elements of the components of the cooperative robotic system in accordance with some aspects of the disclosure.

FIG. 1 illustrates components associated with a cooperative robotic system in accordance with some aspects of the disclosure. FIG. 2 illustrates elements of the components of the cooperative robotic system in accordance with some aspects of the disclosure.

The robotic device 101, in some aspects, may have a moving cart 109, a robot arm 110 attached to the moving cart 109, and an end-effector 111 attached to the tip of the robot arm 110, and may perform work on a work object 102 on a worktable 103. Each device of the robotic device 101 may be connected to the robotic device controller 107 and operates based on control commands (motor current of the robot arm 110, motor current of the end-effector 111, etc.) received from the robotic device controller 107. The robotic device 101 (or component devices) may also transmit the state of the robotic device 101 (e.g., a voltage of the angle sensor attached to the joint of the robot arm 110, or other measurement data) to the robotic device controller 107. The robotic device controller 107 may be connected to the robot task controller 108 via the network 106 (e.g., a wired or wireless network), and may convert (e.g., interpret and/or format information regarding) the state of the robotic device 101 obtained from the robotic device 101 (joint angle of the robot arm 110, end-effector 111 hand position, etc.) and provide it to the robot task controller 108. The robotic device controller 107, in some aspects, may also calculate control commands to the robotic device 101 based on the motion commands (target position of the end-effector 111, etc.) output from the robot task controller 108 and the state of the robotic device 101 input from the robotic device 101. The camera 112 (e.g., as an example of an environmental measurement device to recognize the situation around the robot and cooperative operators) may be configured to measure the distance (depth) from the camera together with a color image, and may be connected to the robot task controller 108 via the network 106. The camera 112 may provide, via the network 106, one or more of the captured data and/or depth information together with the images concerning the captured work object 102 and the robotic device 101 to the robot task controller 108.

FIG. 2 illustrates that the robotic device controller 107, in some aspects, may be a computer with a processing unit 171, a network interface 172, a device interface 173, and a data storage 174, and these components are electrically connected (e.g., by a bus or other communication mechanism as described below in relation to FIG. 18). The processing unit 171 includes a CPU (Central Processing Unit), RAM (Random Access Memory), ROM (Read Only Memory), etc., and may be configured to execute processing based on programs and various data. The data storage 174 may be an auxiliary memory device, such as a hard disk drive, and may store a control program 751 to be executed by the processing unit 171. The device interface 173 may be an interface for connecting to the robotic device 101, and sending control commands to the robotic device 101 and receiving data related to the state of the robotic device 101, and may be configured as appropriate for the equipment comprising the robotic device 101. The network interface 172 connects to the robot task controller 108 and may be an interface for receiving motion commands for the robotic device 101 and sending (providing) data concerning the state of the robotic device 101 (e.g., via communication with the network interface 182 of the robot task controller 108 over the network 106). When the robotic device controller 107 starts up by turning on the power supply, etc., the control program 751 stored in the data storage 174 may be provided to (or accessed by) the processing unit 171 and executed. The control program 751 generates control commands to the robotic device 101 based on the motion commands received from the robot task controller 108 via the network interface 172 and the state of the robotic device 101 received from the device interface 173, and outputs the generated control commands from the device interface 173 to the robotic device 101. In some aspects, the control program 751 may also provide the state of the robotic device 101 received via the device interface 173 to the robot task controller 108 via the network interface 172.

The robot task controller 108, in some aspects, may be a computer with a processing unit 181, network interface 182, user input interface 183, and data storage 184 electrically connected (e.g., by a bus or other communication mechanism as described below in relation to FIG. 18). The processing unit 181, in some aspects, may include a CPU, RAM, ROM, etc., and may be configured to execute information processing based on programs and various data. The network interface 182, in some aspects, may be connected to the robotic device controller 107 and may be an interface for transmitting motion commands of the robotic device 101 to the robotic device controller 107, and for receiving information relating to the state of the robotic device 101 (e.g., via communication with the network interface 172 of the robotic device controller 107 via the network 106). Network interface 182, in some aspects, may also communicate with camera 112 via network 106. User input interface 183 may be any device that takes input from the user, such as a mouse or keyboard, and controls the execution of the program and other operations of the robot task controller 108. Data storage 184, in some aspects, may be an auxiliary memory device, such as a hard disk drive, that may store recognition program 851, robot task data 852, goal planning program 853, load estimation program 861, motion planning program 862, control parameter data 863, and/or robot command generating program 864. When the robot task controller 108 is activated by turning on the power, etc., it may provide (or provide access to) the programs and data stored in the data storage 184 to (or for) the processing unit 181. The recognition program 851, in some aspects, may detect the work object 102 and other objects using images from the camera 112. The goal planning program 853, in some aspects, may plan the robot's task end state (e.g., a destination for the robot's end-effector 111 and an end state such as hold/grab, release, or rotate) using the recognition results of the recognition program 851 and control parameter data 863. The load estimation program 861 estimates the load status of the robot in operation using the data of the robotic device controller 107. The motion planning program 862, in some aspects, may determine a move destination or target location (e.g., associated with a task end state) based on the task end state of the motion planning program 862 and the load status estimation results of the load estimation program 861, and plans the robot's operation to the move destination or target location. The robot command generation program 864, in some aspects, may generate motion commands for the robotic device controller 107 based on a robot motion plan (e.g., including a set of locations or other information defining a path or motion for the robotic device 101) and may send the motion commands to the robotic device controller 107 via the network interface 182.

Figure 3:
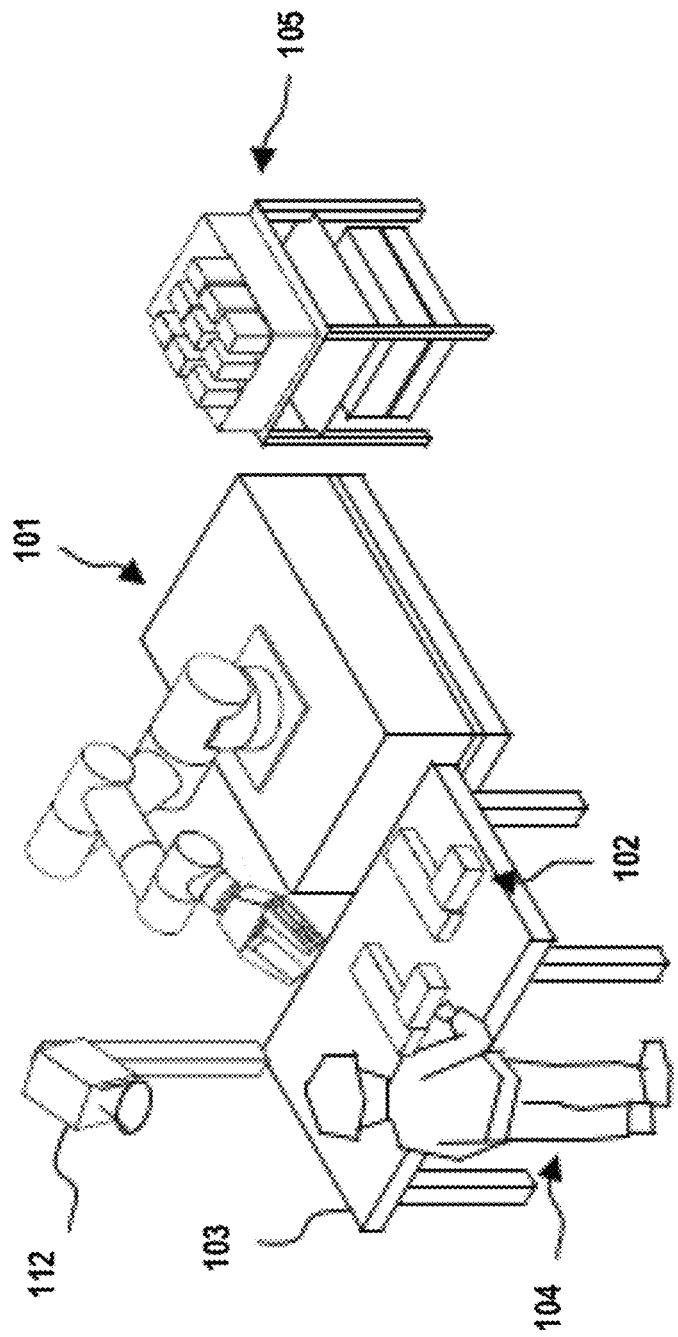
FIG. 3 illustrates a robotic device and workers assembling a work object placed on a worktable or transported by an automatic guided vehicle.

At sites where high-mix low-volume production is carried out, work consisting of multiple processes (assembly work, etc.) may be performed in a single work area (cell), as typified by the cell production system. For example, as shown in FIG. 3, a robotic device 101 and workers 104 may assemble a work object 102 placed on a worktable 103 or transported by an automatic guided vehicle 105. At such work sites, changes in work objects (e.g. a work object 102)

to be handled or replacement of and/or changes to work content may occur in response to fluctuations in demand. For example, after the same worker 104 assembles product A, the work object 102 transported by the automatic guided vehicle 105 may be changed according to a change in the production plan, and the work may shift to assembling a different product B. As a method to improve work efficiency at such a site, there is an example of use in which the robotic device 101 supplies the work object 102 and tools for the work at the right position at the right time, so that the worker 104 can concentrate on the assembly work.

Figure 4:
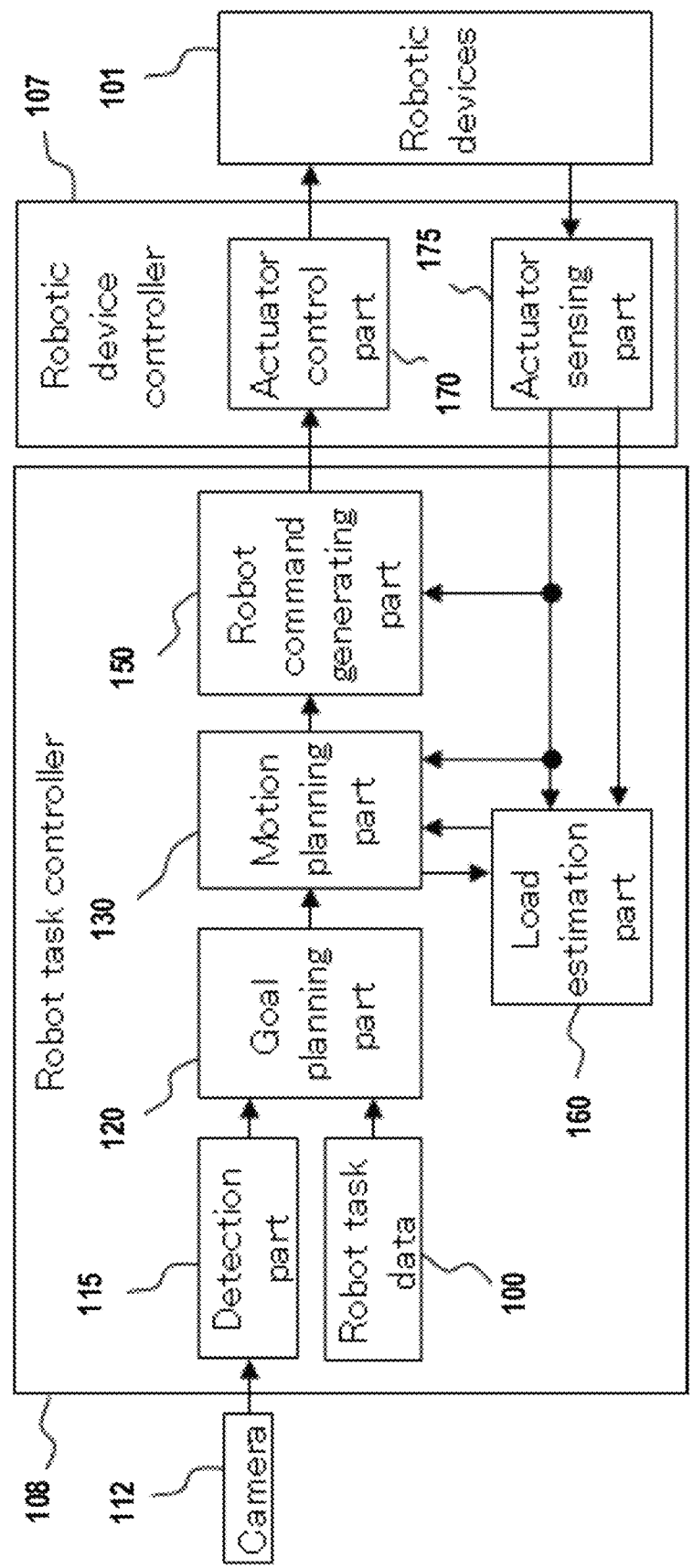
FIG. 4 shows the software configuration of the robot task controller.
Figure 5:
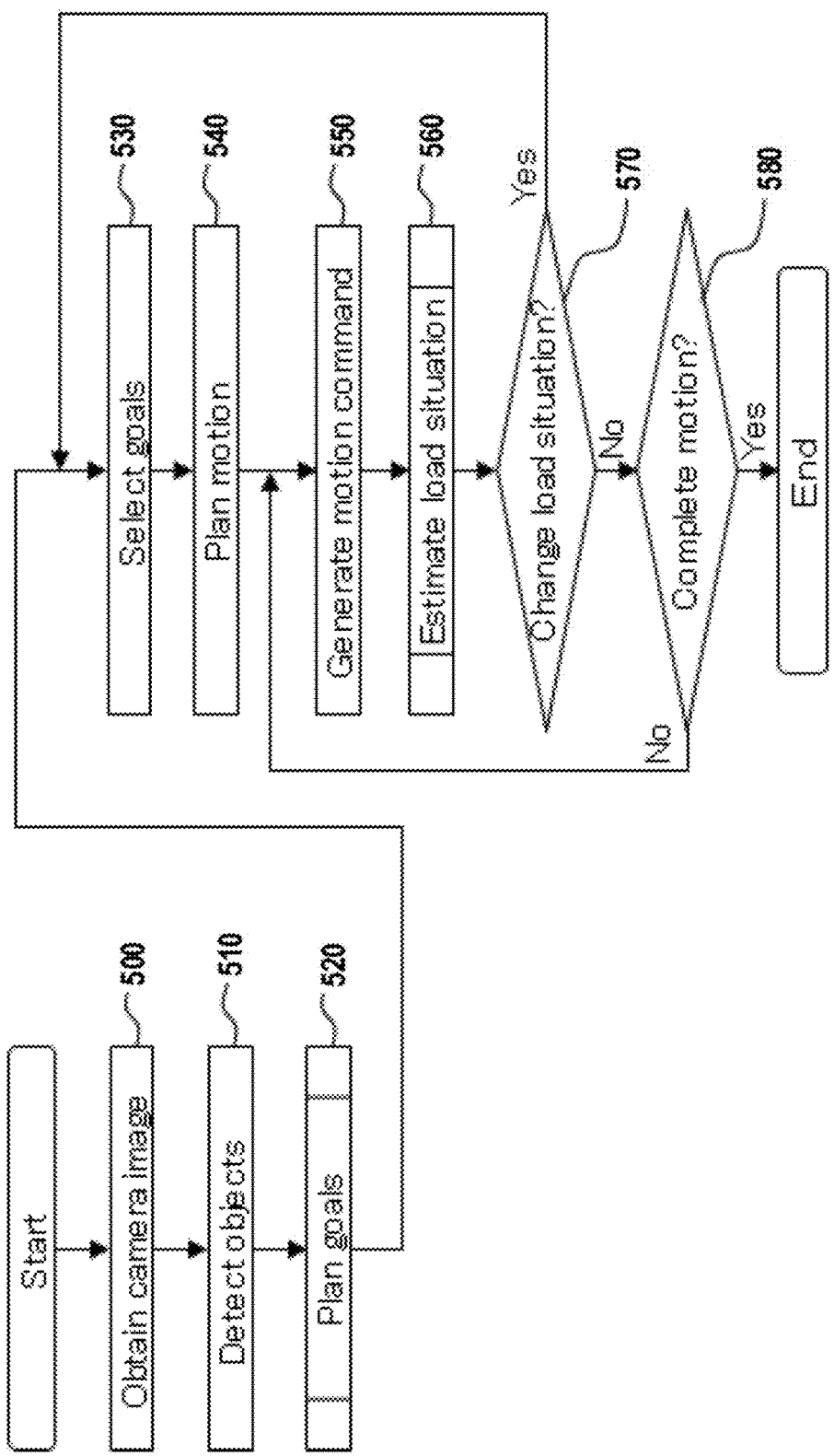
FIG. 5 is a flowchart showing the overall process by which this robotic control system sets the robot's task target and executes robotic motion.
Figure 6:
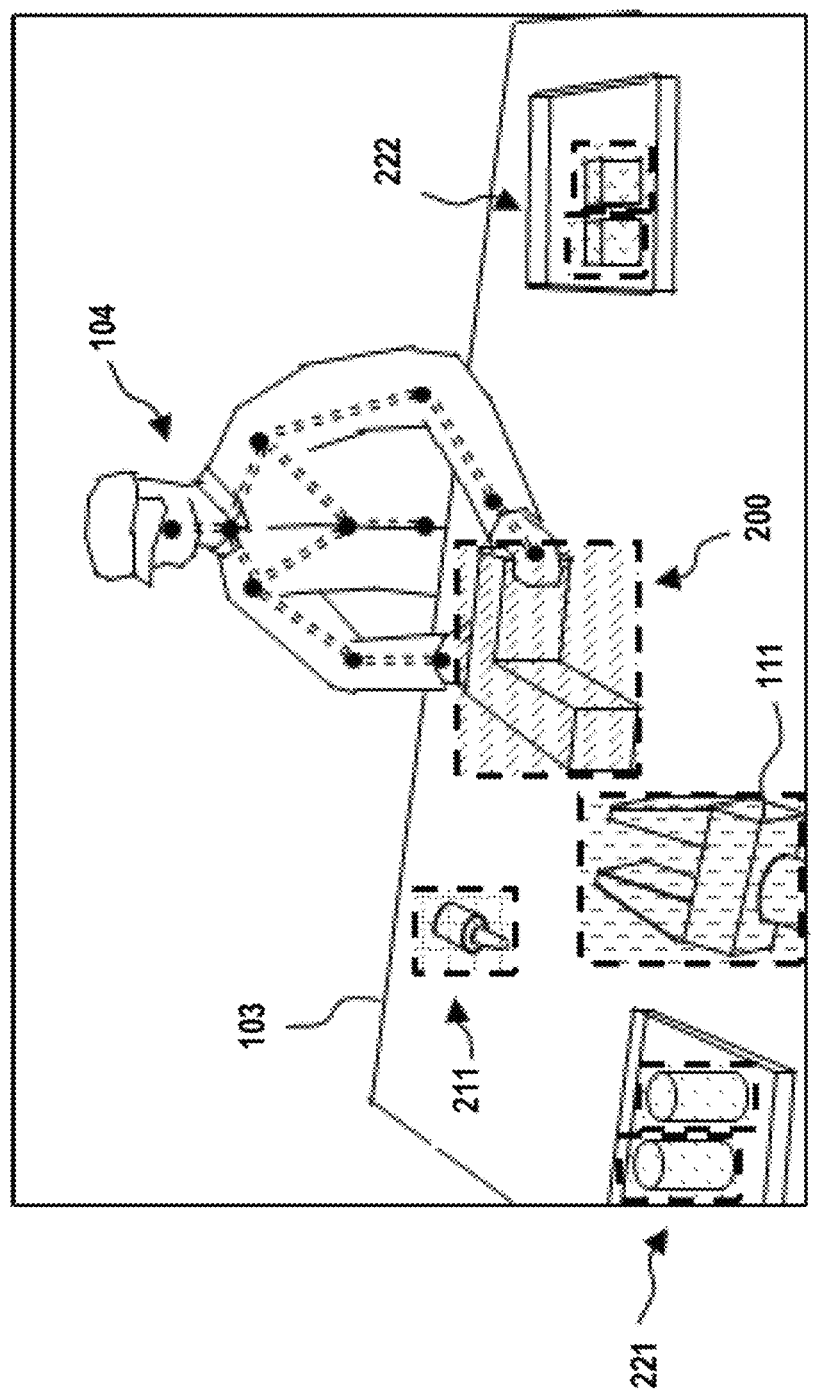
FIG. 6 shows an example of object recognition results from a detection module.

FIG. 4 shows the software configuration of the robot task controller 108. FIG. 5 is a flowchart showing the overall process by which this robotic control system sets the robot's task goal end state (or task target) and executes robotic motion. The detection module 115 captures the image captured by the camera 112 at step 500 and performs object recognition at step 510. Object recognition can use any detection method, for example image processing based on histogram of oriented gradients (HOG) features, or deep learning method using CNN (Convolution Neural Network). FIG. 6 shows an example of object recognition results from the detection module 115. As shown in FIG. 6, the positions of the robot hand (e.g., end-effector 111), the assembly work object 200 being assembled, the tool 211, part 221, and another part 222 in the image are recognized and surrounded by boundary boxes. At this time, the 3D position of the detected object is obtained by combining the center position of the boundary box in the image and the depth information. Furthermore, as shown in FIG. 6, the skeletal position of the worker 104 may be estimated and detected from the image to obtain positional information such as shoulders and fingertips.

Figure 7:
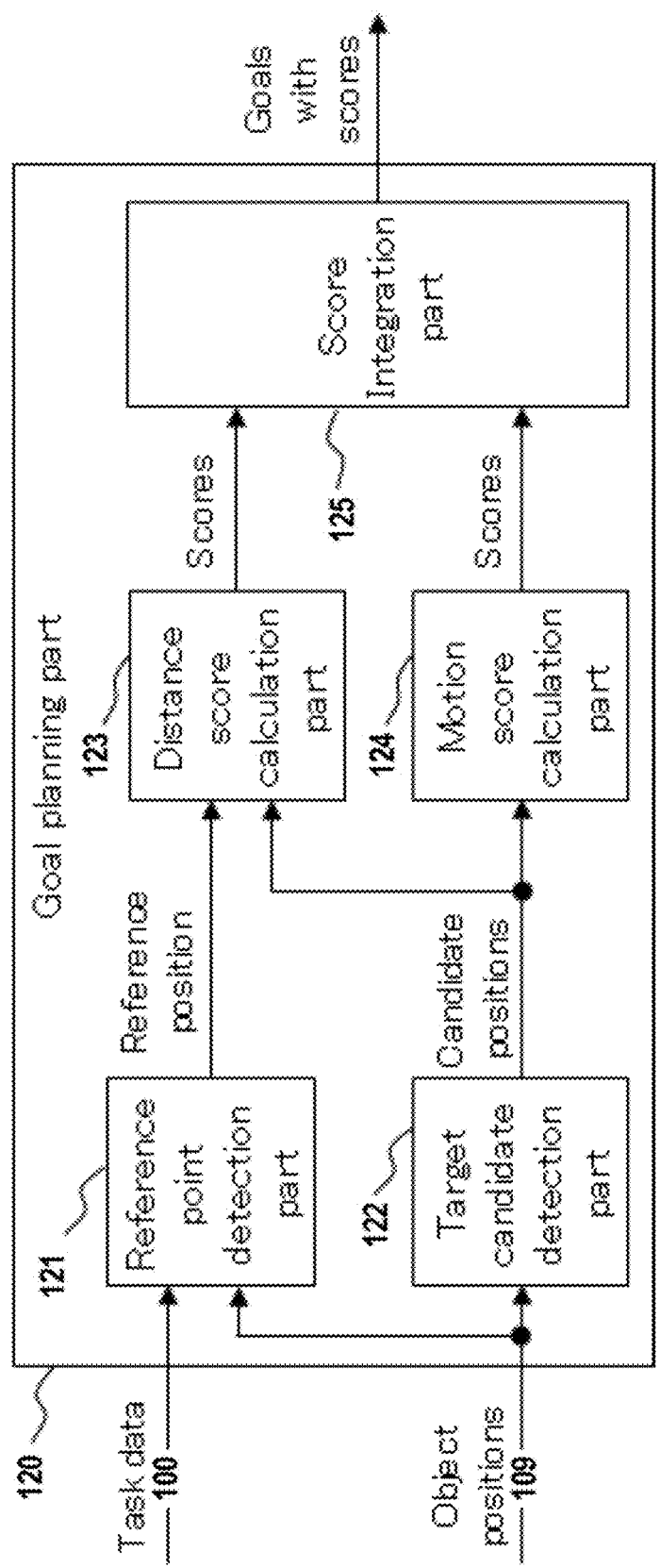
FIG. 7 is a schematic block diagram illustrating detailed software configuration of a goal planning module.
Figure 8:
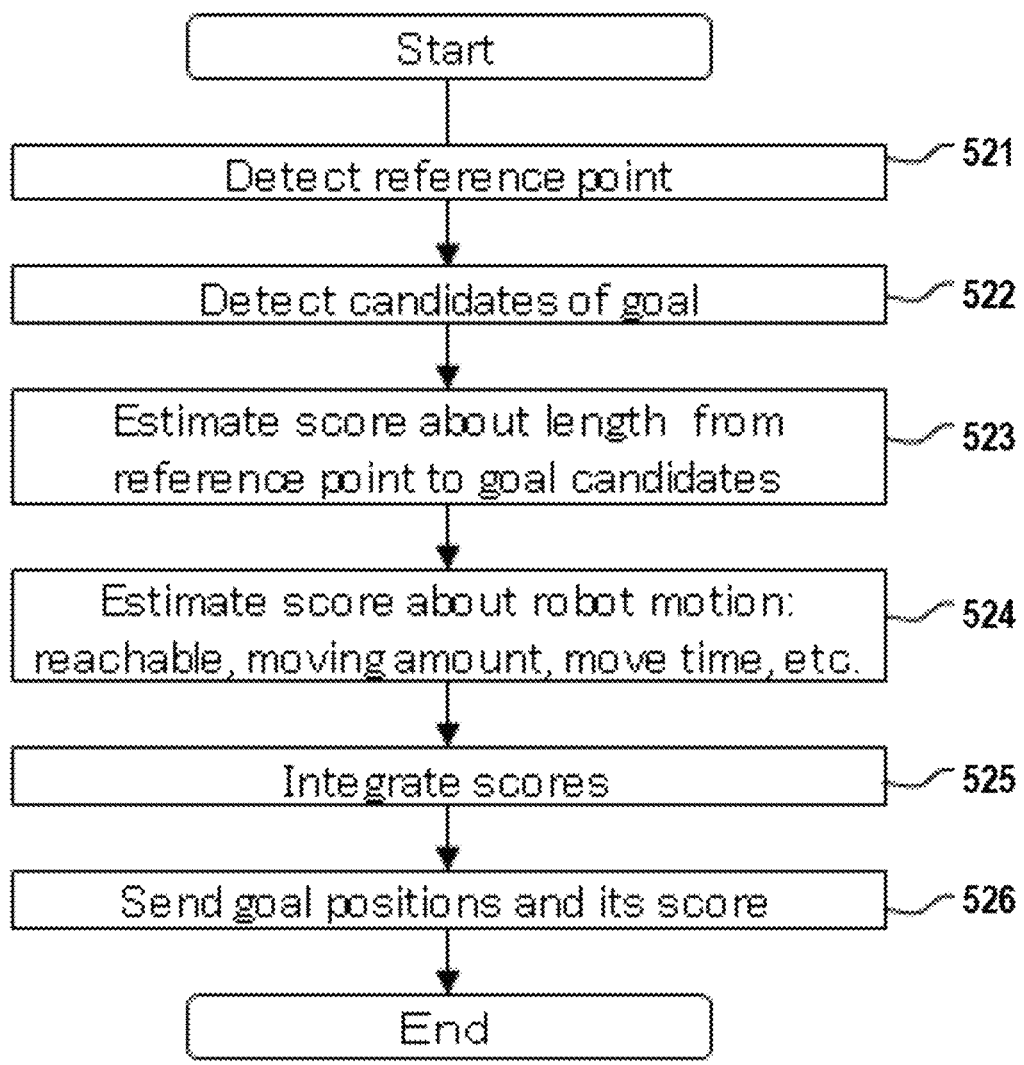
FIG. 8 is a flow chart for describing the detailed process of one step of FIG. 5.
Figure 9:
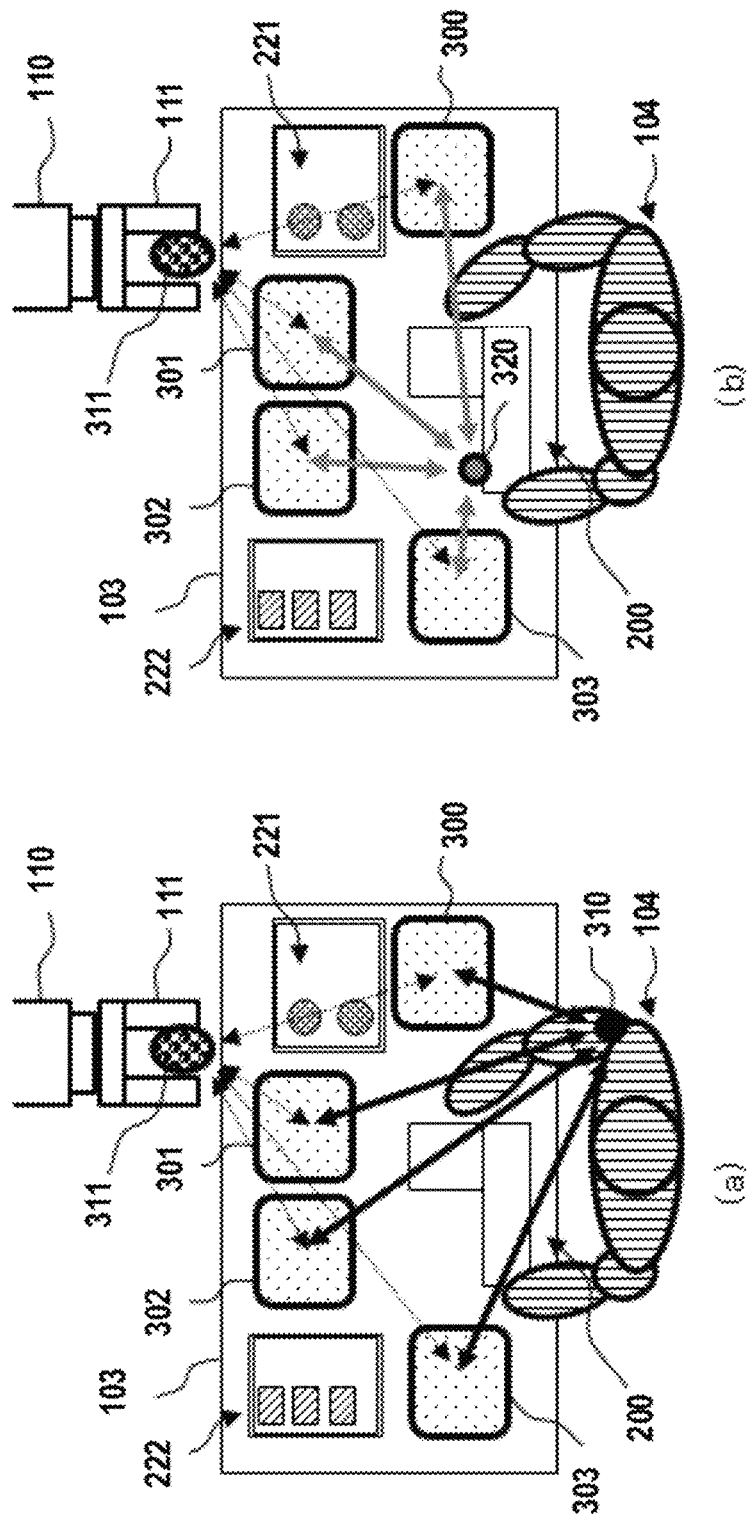
FIG. 9 is an illustrative example describing a goal planning module calculating candidate goal states.

The goal planning module 120, in some aspects, may take the robot task data 100 which defines the task to be performed by the robot (e.g., providing a tool 211 or part 221 to a worker 104), and the object recognition results of the detection module 115 in step 520, and may output candidate target locations to which the robot may move (in association with candidate task end states). FIG. 7 is a schematic block diagram illustrating a detailed software configuration of the goal planning module 120. FIG. 8 is a flow chart for describing the detailed process of step 520 of FIG. 5. FIG. 9 is an illustrative example describing the goal planning module 120 calculating candidate task end states (e.g., alternatively referred to as candidate goal states, or candidate task goals or candidate task goal states). In step 521, the reference point detection module 121 uses the object detection results 109 and task data (e.g., robot task data 100) to detect reference points according to the task (or work) to be performed by the robot. As shown in FIG. 9(*a*), when the robot handling object 311 handled by the robot is a tool 211, the right shoulder position (e.g., reference point 310) of the operator (e.g., worker 104) may be set as the reference point, for the ease of use of the operator (or worker 104), e.g., to minimize a distance between the operator's hand and the selected destination of the tool 211. On the other hand, as shown in FIG. 9(*b*), when the robot handling object 311 is a part for an assembly work object 200, the next attachment position (e.g., reference point 320) may be set as the reference point to minimize a distance between the object and the attachment position (e.g., reference point 320) to reduce a distance for the operator to reach when assembling the assembly work object 200 by placing the robot handling object 311 near the next attachment position (e.g., reference point 320). In step 522, the target candidate detection module 122 outputs a plurality of candidate task end states (or task goal candidates) using the object detection results. In the detection results shown in FIG. 6, a range with a predetermined size is extracted in the area where no object is detected on the worktable 103, and the center position of target areas associated with candidate task end states 300, 301, 302, and 303 shown in FIG. 9, the size of the range, the state of the robot at the center position (posture of end-effector 111, opening/closing of end-effector 111, movement time, etc.) may be output as a candidate task end state (task goal candidate). Extraction of a predetermined range may be configured, for example, to delimit the top surface of worktable 103 with a predetermined grid size and extract a predetermined number of grids and/or grid points. The distance score calculation module 123, in some aspects, may calculate the linear distance between the reference point 310 or the reference point 320 and the candidate task end states 300, 301, 302, and 303 in step 523, and may output the linear distance as a score tied to each task goal candidate. In FIG. 9(*a*), the score of the candidate task end state 300 closest to the reference point 310 is the smallest, and in FIG. 9(*b*), the score of the candidate task end state 303 closest to the reference point 320 is the smallest. In step 524, the motion score calculation module 124 outputs the score associated with the motion of the robotic device 101. As shown in FIG. 9, the score of the candidate task end state 301 that is closest to the end-effector 111 of the robot has the lowest score. In step 525, the score integration module 125 may combine the score calculated by the distance score calculation module 123 and the score calculated by the motion score calculation module 124, multiplied by a product of predetermined weights, and outputs the scores of the candidate task end states 300, 301, 302, and 303. Finally, the goal planning module 120 may output the positions and scores of the candidate task end states 300, 301, 302, and 303 in step 526.

The motion planning module 130 may extract, or select, the task goal with the highest score among the candidate task end states (task goal candidates) output by the goal planning module 120 in step 530, and may plan and output motions to reach the task goal in step 540. In some aspects, the motions to reach the task goal may be a series of positions and postures of the end-effector 111 separated by predetermined time intervals, or it may be a line segment describing the position through which the end-effector 111 should pass. The robot command generation module 150 may generate robot motion commands (e.g., joint angle commands) based on the motion information output by the motion planning module 130 and the sensor information (e.g., robot position information) output by the robotic device controller 107 in step 550, and may output the robot motion commands to the robotic device controller 107. The load estimation module 160, in some aspects, may estimate the load on the robotic device 101 based on the sensor data of the robotic device 101 obtained by the robotic device controller 107 in step 560, and may output the modified score values for each candidate task end state and the modified state of the candidate task end states (task goal candidates) to the motion planning module 130 as goal modification values associated with the detected and/or load status estimates. At step 570, the motion planning module 130 may re-evaluate a current, or selected, task end state (a current task goal) based on the load status of the load estimation module 160. If there is a change in the score order of the candidate task end states (task goal candidates), the motion planning module 130 returns before step 530 to change the task end state (or task goal), but if there is no change, it continues the process. If the processing is continued, the motion planning module 130 determines at step 580 whether the operation is completed to the specified state, and if the operation is not completed, the processing returns to step 550 to output an additional operation command to continue the operation as discussed above, and if the operation is completed, all processing is terminated.

Figure 10:
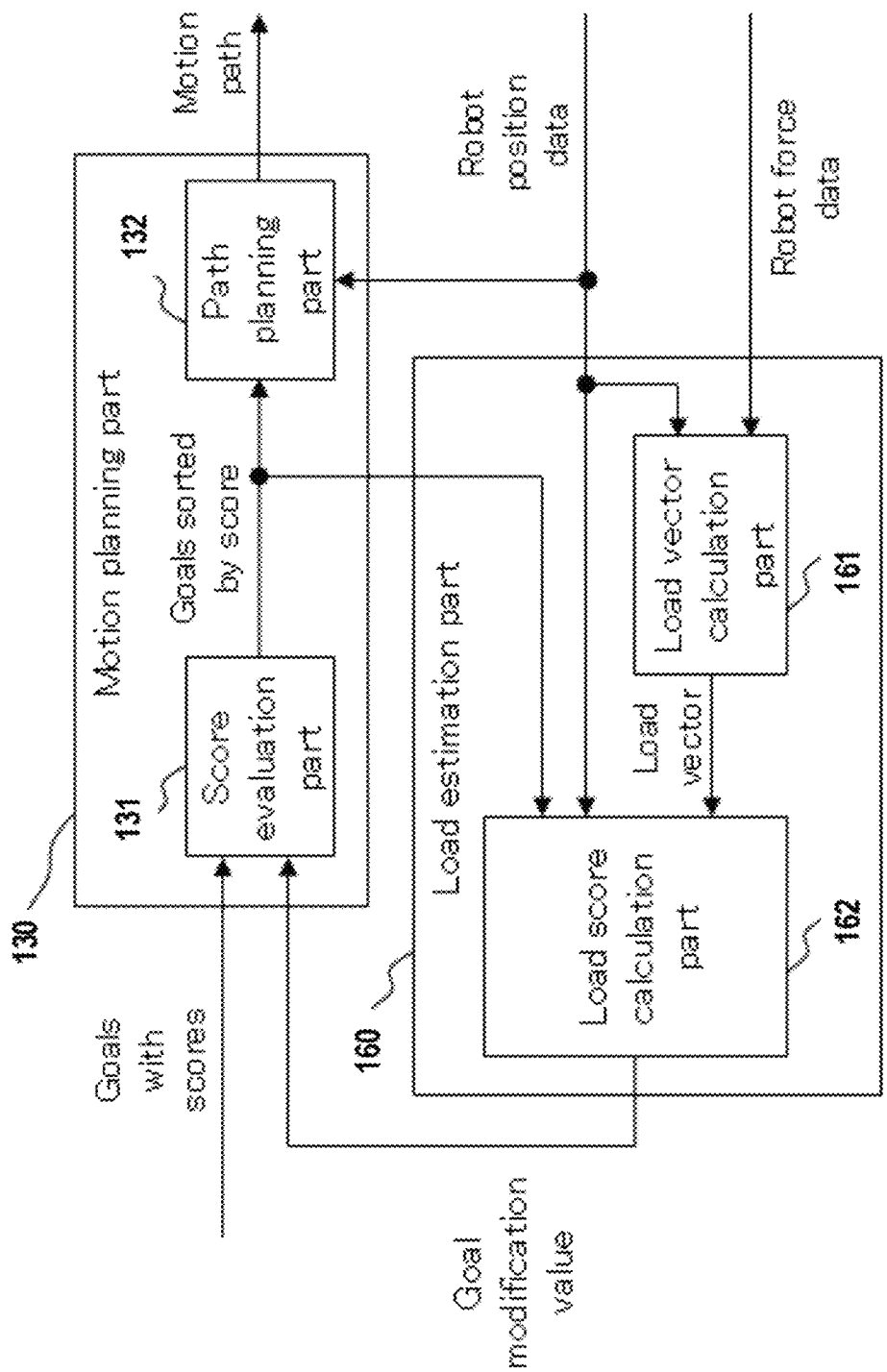
FIG. 10 is a schematic block diagram showing the detailed software configuration of a motion planning module and a load estimation module.
Figure 11:
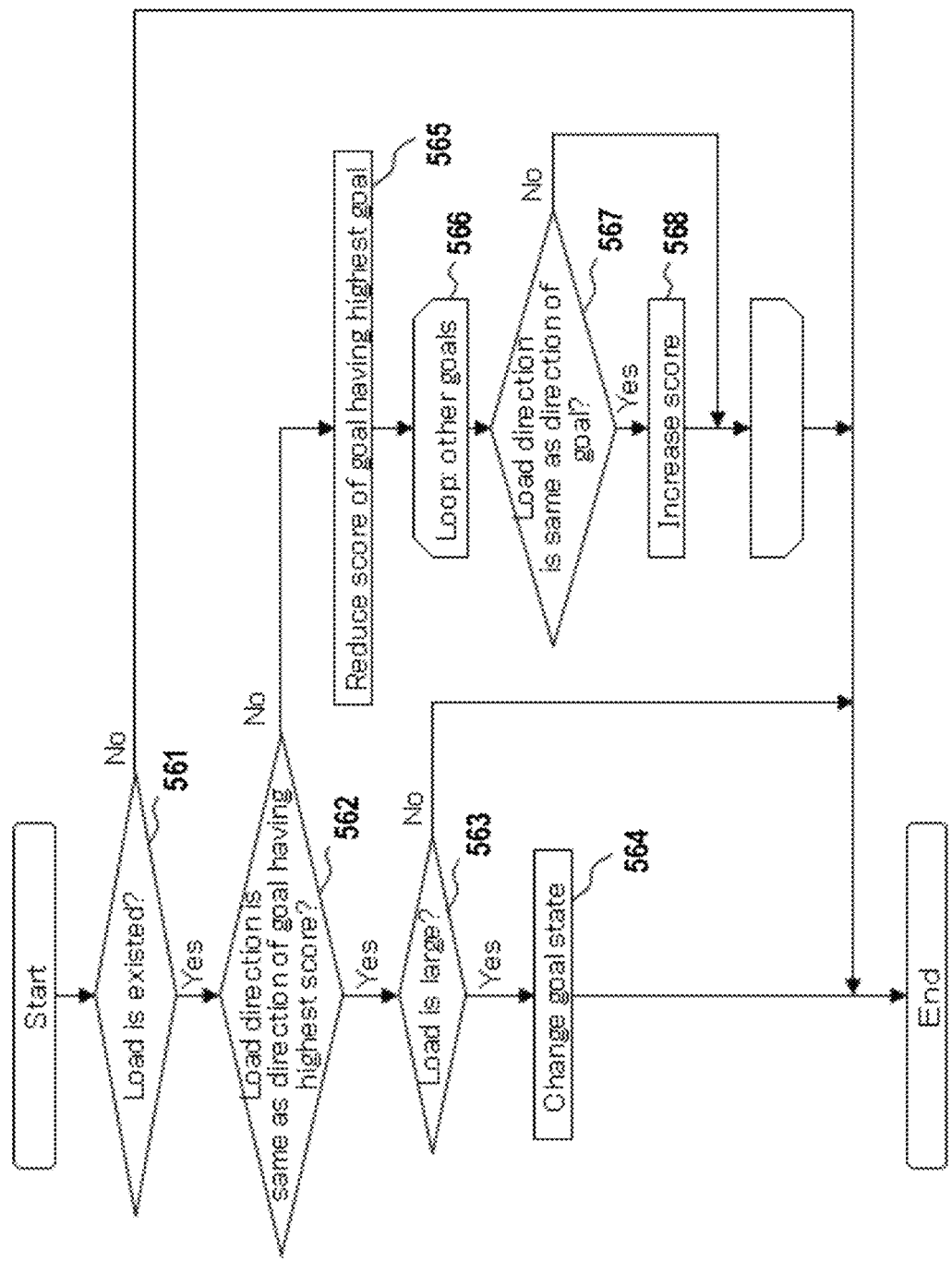
FIG. 11 is a flowchart describing the detailed process of a step of FIG. 5.
Figure 12:
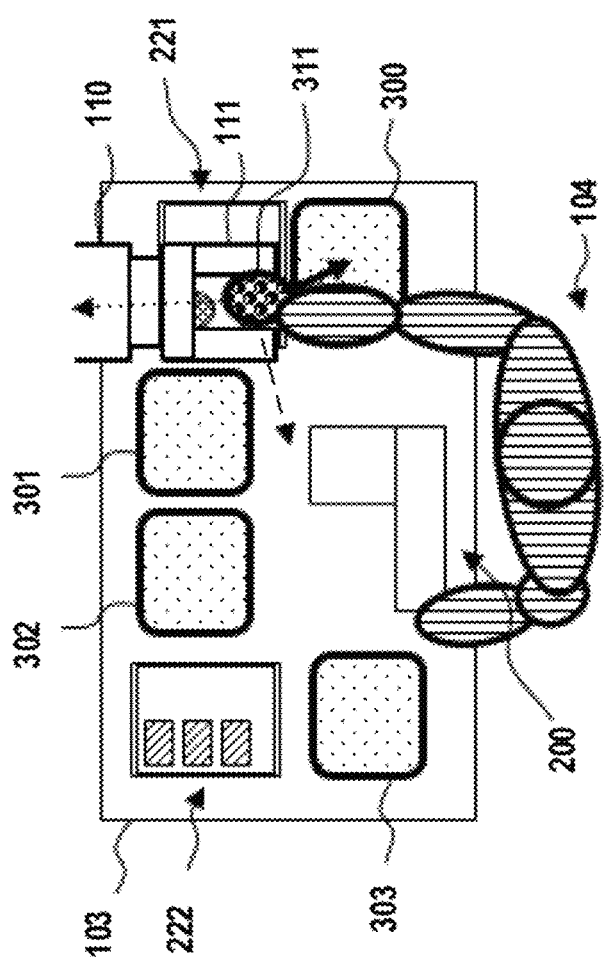
FIG. 12 is an illustrative example describing how an operation planning module and a load estimation module estimate the load status and change the task goal according to the load status.

FIG. 10 is a schematic block diagram showing the detailed software configuration of the motion planning module 130 and the load estimation module 160. FIG. 11 is a flowchart describing the detailed process of step 560. FIG. 12 is an illustrative example describing how the motion planning module 130 and the load estimation module 160 estimate the load status and change the task end state (or task goal) according to the load status. The load vector calculation module 161 may calculate the load vector (size and direction of the load) applied to the robot handling object 311 being handled by the robot based on the robot position data (e.g., joint angle, etc.) and robot force data (e.g., joint torque, etc.) output by the robotic device controller 107. In step 561, the load score calculation module 162 may first determine whether the magnitude (length) of the load vector output by the load vector calculation module 161 is larger than a predetermined value to check if a load exists or not, and if the magnitude of the load is less than the predetermined value, the process may end without further processing, and if the magnitude of the load is larger than the predetermined value, the process may proceed to step 562. In step 562, it may be determined whether the load is oriented toward the candidate task end state with the highest score, i.e., the destination to which the robot is moving and, if the orientation is consistent, the process proceeds to step 563; otherwise, the process proceeds to step 565. In step 563, it may be determined whether the magnitude of the load is larger than a predetermined level, and if the magnitude of the load is larger than the predetermined level, the process may proceed to step 564; otherwise, the process may be terminated. In step 564, a state of the task end state (or task goal) with the highest score is changed. For example, if the robot handling object 311 being handled by the robotic device 101 is a tool (e.g., tool 211) and the worker 104 is about to receive it from the robotic device 101 to use the tool, the load is applied in the same direction as the direction of the candidate task end state 300, as shown by the solid arrow in FIG. 12, the state of end-effector 111 of a current task end state (or current task goal) may be changed to the open state, so that the tool is handed to operator (e.g., worker 104) on the spot. The state of the task end state (or task goal) to be changed need not be limited to the open/closed state of the end-effector 111, but may be a reduction in travel time or a change in height at the center position of the candidate task end state 300.

If it is determined in step 562 that the direction of the load is not the same as the candidate task end state with the highest score, then in step 565, the score of the candidate task end state with the highest score may be reduced. Then, in step 566, a loop process may be executed to process all the other candidate task end state one by one, and in step 567, it may be determined whether the direction of the load is toward the other candidate task end state, and if the direction is toward the candidate task end state, the score of the corresponding candidate task end state may be increased in step 568, and if not, step 568 may be skipped and after performing, or skipping, step 568 the next loop process is executed. If the loop process is complete, the process of step 560 is terminated and the process illustrated in FIG. 5 proceeds to step 570. If the worker 104 extends an arm/hand to take the part 221 and makes contact with the robotic device 101, the load may be applied in the direction opposite to that of the candidate task end state 300, as shown by the dotted arrow in FIG. 12. In this case, only the process of step 565 is executed (e.g., the loop beginning at step 566 may be skipped based on the load being identified as being in a direction related to other candidate task end states or task goal candidates), and the process of step 560 is repeated, resulting in a lower score for the candidate task end state 300 and, possibly, a (relatively) higher score for the next highest scoring candidate task end state 301, such that subsequent processing at steps 570, 530, and 540, may result in robotic device 101 changing from candidate task end state 300 to candidate task end state 301. In some aspects, the process described above for a determination in step 562 that the direction of the load is not the same as the candidate task end state with the highest score (including the loop beginning at 566) may be performed even for a load applied in the direction opposite to the candidate task end state with the highest score.

In some aspects, the operator (e.g., worker 104) may intentionally try to change the destination of the robot handling object 311, e.g., by applying a load in the same direction as the direction of the candidate task end state 303 (e.g., a candidate task end state that does not currently have the highest score), as shown by the dashed arrow in FIG. 12. In this case, in addition to the processing of step 565, the processing of step 567 may identify, for candidate task end state 303, that the load direction is the same as the direction of the goal and may proceed to increase a score associated with candidate task end state 303 at step 568 (e.g., step 568 is executed for the candidate task end state 303). The processing of step 560 (e.g., the loop beginning at step 566) may continue to the end, resulting in a higher score for the candidate task end state 303, such that subsequent processing at steps 570, 530, and 540, may result in robotic device 101 changing from candidate task end state 300 to candidate task end state 303.

The score evaluation module 131, in some aspects, may combine the goal modification values (e.g., values used to modify scores associated with one or more candidate task end states or task goal candidates based on the load estimation associated with step 560) output by the load score calculation module 162 with the candidate task end states (or task goal candidates) output by the goal planning module 120 in step 530, and may output multiple candidate task end states (task goal candidates) arranged in order of highest (or lowest) score. The path planning module 132 may generate the motion path from the current position to the goal state of the candidate task end state with the highest score in step 540 (e.g., to update a motion path to be consistent with the candidate task end state with the highest score after updating the scores). The path can be a series of positions and postures of the end-effector 111 separated by predetermined time intervals, or it can be a line segment describing the position through which the end-effector 111 should pass. The process of FIG. 5, in some aspects, may continue until determining that there is no change to the load situation at step 570 as described above and then determine, in step 580 whether the current state of the robot is in the final state of the current, or selected, task end state (e.g., a current, or selected task goal). If the motion is determined to not be completed, the process may return to step 550 and motion commands may be output to continue the motion, but if the motion is determined to be completed, the process may be terminated.

As indicated in FIGS. 4, 5, 7, and 10, the goal planning module 120 (e.g., a goal planning algorithm or program) may generate a single set of candidate task end states (task goal candidates) that may be used for the duration of a task. For example, the goal planning module 120 may generate a set of candidate task end states (task goal candidates) including a set of target area candidates (e.g., defined by a size/area, a center of, or other particular location within, the target area candidate, and a shape of the target area candidates) and a set of candidate states of the robot. The generated set of tasks may then be used by motion planning module 130 to select and/or update a task goal throughout the duration of the task (e.g., based on feedback from the actuator sensing module 175 and/or load estimation module 160). Accordingly, processing resources (e.g., processing cycles, power, etc.) or processing time associated with processing feedback and updating a task end state (or task goal) may be reduced by updating weights associated with the generated set of candidate task end states (task goal candidates) without having to generate a new set of candidate task end states (task goal candidates).

Thus, by changing the task end state (e.g., a task goal or task target), according to the direction and magnitude of the load applied by the robot during moving, the robot can instantly (or quickly) adjust its motion to the work of the operator in an indefinite (or changing or changeable) environment and behave in such a way that it does not become an obstacle to the cooperative operator, thereby improving the efficiency of the cooperative work.

Figure 13:
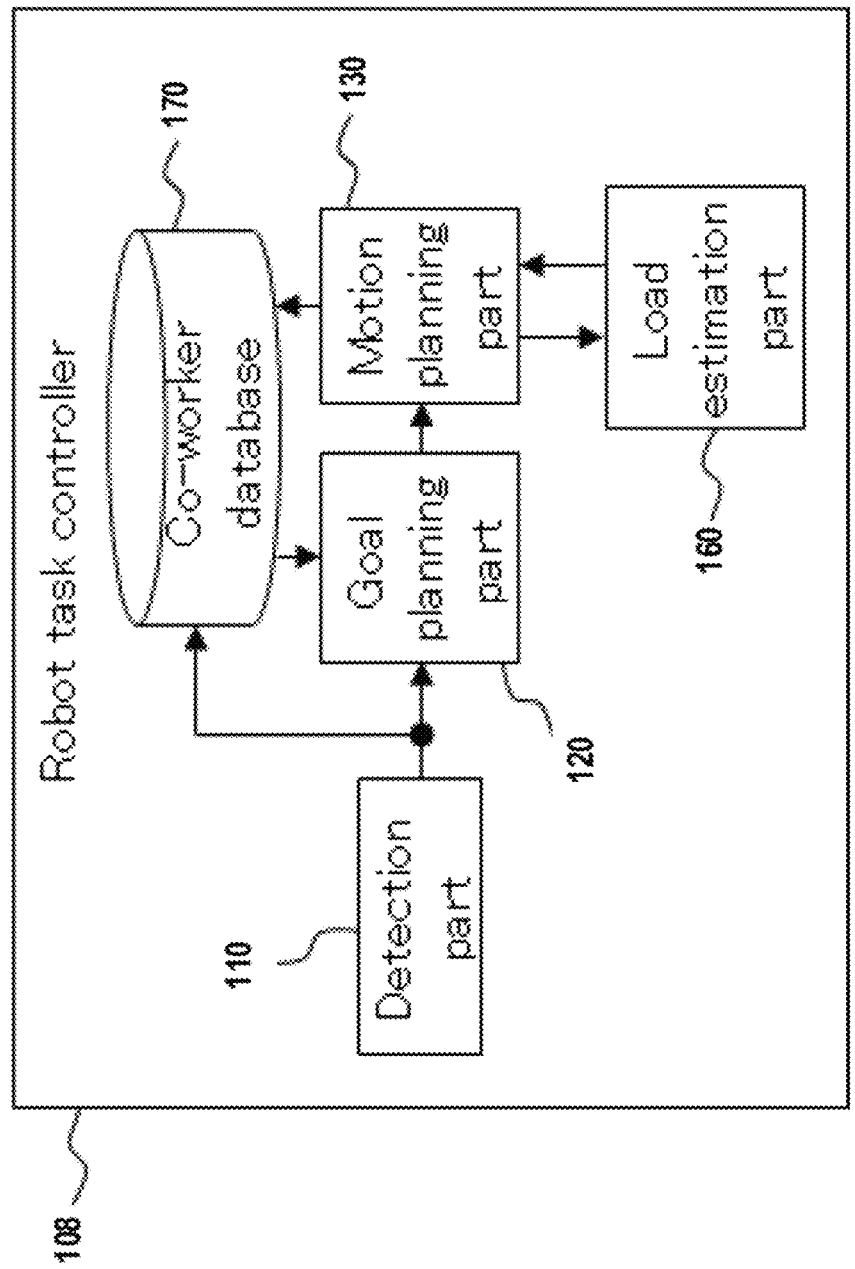
FIG. 13 shows the software configuration of a robot task controller.
Figure 14:
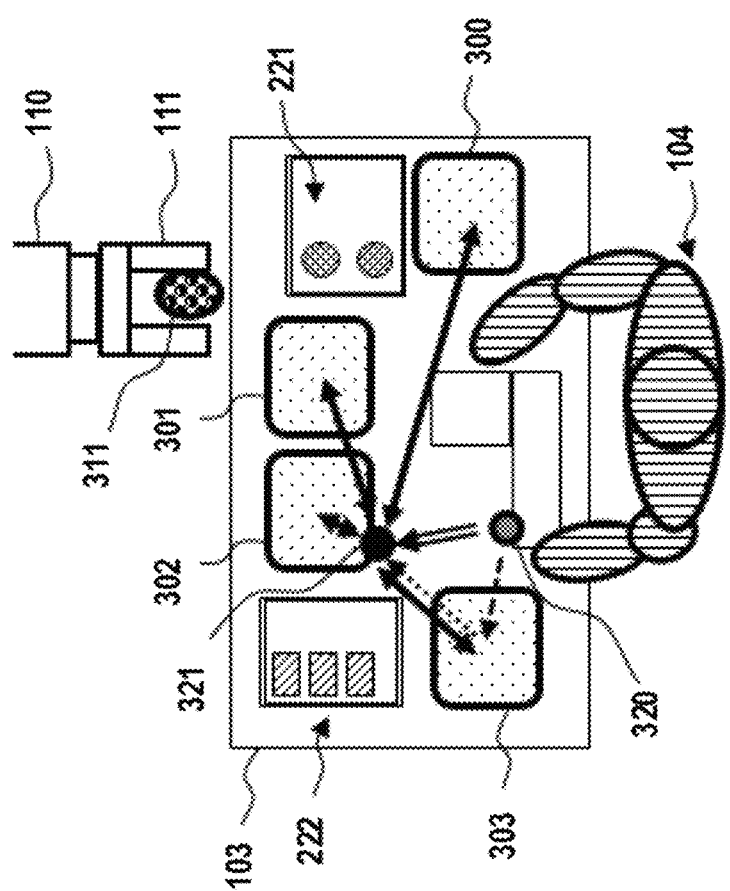
FIG. 14 shows how this control system may set the robot's goals according to the characteristics of the worker.

This disclosure further provides a method of storing the characteristics of the operator and changing (or generating) the motion targets (e.g., candidate task end states or task goal candidates) according to the characteristics of the operator. FIG. 13 shows the software configuration of the robot task controller 108, and FIG. 14 shows how this control system may set the robot's goals according to the characteristics of the worker. The robot task controller 108, in some aspects, may further be equipped with a co-worker database 170. The detection module 115 may identify, in some aspects, the individual worker 104, and the co-worker database 170 may output the personal data associated with the worker 104 to the goal planning module 120. The goal planning module 120 may, in some aspects, use the personal data of the worker 104 when planning the task goal (and/or generating the candidate task end states or task goal candidates), and may reflect (or consider) the characteristics of the worker 104 when planning the task goal. The motion planning module 130, in some aspects, may store, as personal data, information in the co-worker database 170 regarding the amount of change in a task goal when the task goal is changed (e.g., as described in relation to steps 530 to 1700 of FIG. 5).

As shown in FIG. 14, for reference point 320, a candidate task end state (task goal) selection that does not consider the characteristics of the worker may select the candidate task end state 303 at the end of the dashed arrow. If a worker 104 changed a current task end state (task goal) in the past and the amount of variation scaled by a predetermined magnitude of the movement is the dotted arrow, the double-line arrow that combines the dashed and dotted arrows (indicating a difference between the reference point 320 and an updated reference point 321) may be stored as personal data representing the worker's characteristics. As opposed to a task end state (task goal) determined without consideration of the stored personal data for a worker 104 (e.g., candidate task end state 303), the task end state (task goal), in some aspects, may be determined and/or set based on the stored personal data for the worker 104. For example, instead of using reference point 320 to perform the task goal determination, the stored personal data for a worker 104 may lead to the task end state (task goal) determination being based on the updated reference point 321, which is different from reference point 320. In the case of the relationship shown in FIG. 14, candidate task end state 302 may be set as the task end state (task goal). In this way, the task end state (task goal) (e.g., the selected and/or determined task end state or task goal) may be modified according to the characteristics of the individual worker, enabling the robot to perform tasks tailored to the individual worker, thereby further improving the efficiency of cooperative work.

In some aspects of the disclosure, a task end state (task goal) may be modified based on patterns of load. FIG. 15 is a list of examples of load patterns that may be used in some aspects of the disclosure to modify and/or update task goals. For example, when the load score calculation module 162 detects a load pattern shown in FIG. 15, it may change the state of the task end state (task goal) (e.g., a selected task end state or task goal) to perform a corresponding operation shown in FIG. 15. In some aspects, if the load score calculation module 162 detects the two quick downward pulling motions shown in FIG. 15, it may change the hand open/close state of the end effector 11 to open the hand on the spot. In this way, the operator can receive tools and modules on the spot. If a force is quickly pulled after pushing against the direction of moving shown in FIG. 15, and/or if a force is applied in a direction of a different candidate task end state (task goal candidate), the score of the current task goal may be lowered and the score of the candidate task end state in the direction where the force was applied may be increased. In this way, the worker can actively change the task end state (task goal) and achieve a work arrangement that is efficient for the worker. By changing the state of the task end state (task goal) according to a specific load pattern in this way, the worker can explicitly change the task end state (task goal) and specify a more efficient work arrangement for the worker, thereby improving the efficiency of the cooperative work.

Additional embodiments may include various combinations, modifications, or extensions of elements discussed above. For example, the robot arm 110 used in this example description is illustrated as a vertical articulated robot, but it can be a cartesian coordinate robot, a horizontal articulated robot, a parallel link robot, etc. Although the robotic device controller 107 and the robot task controller 108 are different controllers in this example description, they can be configured to execute multiple programs within a single controller.

Additionally, while FIG. 6 shows object detection using bounding boxes, detection methods other than this method can be used, for example, the system, or the detection module 115, may be configured to use classification results from image segmentation. The task end state (task goal) or associated target area(s) shown in FIG. 9 may be illustrated using a rectangle, but may be of any shape determined by the work task (or objective) associated with the task end states (task goals). The task end state(s) or target area(s) may be of different sizes and, in some aspects, different task end states or target areas may have overlapping regions. While task end states or target areas are illustrated in FIG. 9 as a set of discontinuous regions, a task end states or target areas may be associated with location information expressed with reference to a (continuous) coordinate system (e.g., may be specified by a point in the coordinate system or by a range of values along one or more axes defined for the coordinate system).

While the scoring method described in relation to FIG. 9 is based on distance, other metrics may be used singly or in combination calculate a score for each of a plurality of candidate task end states (task goal candidates). For example, the system may be configured to simulate in advance the static load due to the curvature of the movement path and the posture of the worker 104 and robotic device 101 at the goal point, and the simulated and/or predicted load may be used to calculated a score for a task goal candidate. Additionally, or alternatively, the method of changing a score associated with one or more candidate task end states (task goal candidates), a selected task goal candidate, and/or a state of the system may not be limited to the method illustrated in FIGS. 5 and 11, but may further include a consideration of different changing conditions, and the state may be changed at one or more of steps 530, 540, and/or 550 by changing the path of the motion, changing the speed command, or changing the stiffness and elasticity set values in force control.

FIG. 16 is a flow diagram 1600 illustrating a method in accordance with some aspects of the disclosure. In some aspects, the method may be performed by an apparatus (e.g., one of a cooperative robotic system, a robot task controller 108, or a computer device 1805) to control a robotic device in an industrial setting. The apparatus may receive at least one input data set including one or more of task data regarding a first task for a cooperative robotic device or environmental data regarding at least a work area and a human operator associated with the first task. The at least one input data set, in some aspects, may be related to an objective of the first task. In some aspects, the first task may be a sub-task of a larger manufacturing or assembly task. For example, for a larger goal of assembling a product, a first task may be defined as providing a tool or part to a human worker assembling the product at a particular point in an assembly process. Accordingly, the at least one input data set may include data regarding an objective of the first task, a reference point (e.g., reference point 310 or reference point 320) associated with the first task, a tool or part associated with the first task, image data associated with the work area and the human operator (or worker), personal (historical) data associated with a particular human operator, or other task data relevant to defining and/or generating candidate task end states (e.g., task goal candidates or candidate robotic task targets). For example, referring to FIGS. 5 and 7, the apparatus (e.g., the robot task controller 108, the detection module 115, and/or the goal planning module 120) may capture images at step 500 and perform object recognition at step 510 or may receive task data as depicted in FIG. 7.

At 1620, the apparatus may generate, for a cooperative robotic device, a plurality of candidate task end states associated with the first task. In some aspects, the candidate task end states may be associated with a target area candidate and a state of the cooperative robotic device (e.g., a state of an end-effector of the cooperative robotic device). For example, each candidate task end state for the first task may be associated with a target location for placing an object held by the cooperative robotic device (e.g., a target location and an open/release state of a component of the cooperative robotic device holding the object). For example, referring to FIGS. 5, 7, and 9, the apparatus (e.g., the robot task controller 108, the goal planning module 120, and/or the target candidate detection module 122) may output, at step 520, candidate task end states (task goal candidates) such as candidate task end states 300, 301, 302, and 303 to which the robot may move.

After generating the plurality of candidate task end states at 1620, in some aspect, the apparatus may generate (e.g., calculate or compute) a score for each of the plurality of candidate task end states associated with the first task. In some aspects, the score for each of the candidate task end states associated with the first task may be generated based on a reference point and a set of distances or other characteristics. For example, referring to FIGS. 5 and 7-9, the apparatus (e.g., the robot task controller 108, the goal planning module 120, and/or the distance score calculation module 123) may calculate in association with step 520 (e.g., steps 523-1205) scores associated with each of the generated candidate task end states (task goal candidates) such as candidate task end states 300, 301, 302, and 303 to which the robot may move.

At 1640, the apparatus may select, for the cooperative robotic device, a first task end state from the plurality of candidate task end states. The first task end state, in some aspects, may be associated with a first target location for placing an object held by the cooperative robotic device. In some aspects, selecting the first task end state at 1640, may include selecting the first task end state associated with a best score, where a best score may be a lowest score or a highest score depending on the method used to generate (or calculate) the score for each candidate task end state. For example, referring to FIGS. 5 and 7-9, the apparatus (e.g., the robot task controller 108, the motion planning module 130, the score evaluation module 131, and/or the path planning module 132) may, at step 530, select (or extract) the task end state (or task goal) with the highest score among the candidate task end states (e.g., candidate task end states 300, 301, 302, and 303 or task goal candidates) output by the goal planning module 120 at step 520 (e.g., step 526).

At 1650, the apparatus may receive load data regarding a load experienced by the cooperative robotic device. The load data, in some aspects, may include magnitude data and direction data associated with the load experienced by the cooperative robotic device. In some aspects, the magnitude data and the direction data may be associated with one pattern of a plurality of patterns (e.g., the magnitude and direction patterns discussed in relation to FIG. 15). Each of the plurality of patterns, in some aspects, may be associated with at least one value associated with a corresponding at least one of the plurality of candidate task end states. The at least one value, in some aspects, may be a value to be added or subtracted from a score or a value by which to multiply or divide a score associated with the corresponding at least one of the plurality of candidate task end states. For example, referring to FIGS. 5 and 10-12, the apparatus (e.g., the robot task controller 108, the load estimation module 160, and/or the load vector calculation module 161) may, at step 560, collect and/or receive sensor data regarding the robotic device 101 (such as sensor data reflecting one of the force vectors illustrated in FIG. 12) obtained by the robotic device controller 107.

The apparatus may, at 1650, additionally, or alternatively, receive at least one additional input data set including updated environmental data regarding at least one of the work area and/or the human operator associated with the first task (and the plurality of candidate task end states). The additional input data set may include data regarding a change to a position and/or orientation of the human operator or to one or more objects (e.g., a product to be assembled, a tool, a part, etc.) on the work area. The additional input data set may be used to update one or more locations (e.g., reference points) associated with a score generation and/or calculation. For example, if a score is based on, at least in part, on a distance between a target area associated with a candidate task end state and one of a location of a right shoulder of a human worker or a position of a component of a product to be assembled (e.g., a point on the product at which a current part is to be attached or a current tool is to be used), the location used for subsequent score calculations may be based on the updated location indicated and/or included in the additional input data set.

The apparatus may generate, based on the load data, an updated score for each of the plurality of candidate task end states associated with the first task. In some aspects, generating the updated score may be based on the at least one value associated with the load data (e.g., the magnitude and direction data associated with a pattern of the plurality of patterns). In some aspects, the apparatus may generate the updated score based on the additional input data set (e.g., based on the updated locations associated with the score calculation and indicated and/or included in the additional input data set). For example, referring to FIGS. 5 and 10-12, the apparatus (e.g., the robot task controller 108, the load estimation module 160, and/or the load score calculation module 162) may, at step 560 (e.g., via steps 565 to 568), generate (and output) the modified score values for each candidate task end state and the modified state of the candidate task end states (task goal candidates) to the motion planning module 130 as goal modification values before returning to step 530.

Figure 17:
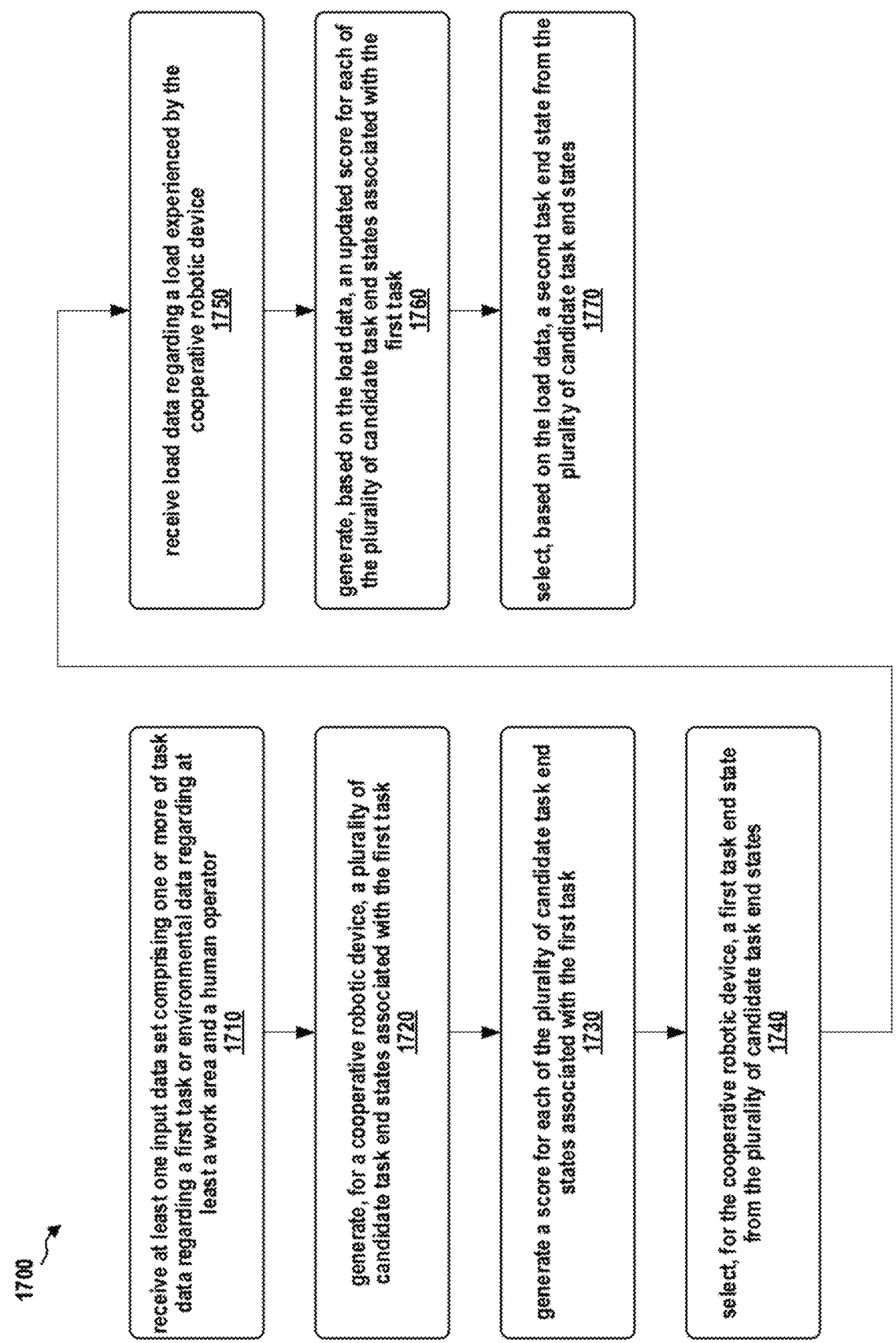
FIG. 17 is a flow diagram illustrating a method in accordance with some aspects of the disclosure.

At 1670, the apparatus may select, based on the load data, a second task end state from the plurality of candidate task end states. In some aspects, the second task end state may be associated with a second target location for placing the object. The second task end state, in some aspects, may be associated with releasing the object at a current location. To select the second task end state at 1670, in some aspects, the apparatus may select the second task end state associated with a best (e.g., highest or lowest) updated score (after receiving the load data at 1650 and generating updated scores at 1660). For example, referring to FIGS. 5 and 7-9, the apparatus (e.g., the robot task controller 108, the motion planning module 130, the score evaluation module 131, and/or the path planning module 132) may return to step 530 to select (or extract) the task end state (task goal) with the highest updated (or current) score among the candidate task end states 300, 301, 302, and 303 (or task goal candidates) output by the goal planning module 120 at step 520 (e.g., step 526), FIG. 17 is a flow diagram 1700 illustrating a method in accordance with some aspects of the disclosure. In some aspects, the method may be performed by an apparatus (e.g., one of a cooperative robotic system, a robot task controller 108, or a computer device 1805) to control a robotic device in an industrial setting. At 1710, the apparatus may receive at least one input data set including one or more of task data regarding a first task for a cooperative robotic device or environmental data regarding at least a work area and a human operator associated with the first task. The at least one input data set, in some aspects, may be related to an objective of the first task. In some aspects, the first task may be a sub-task of a larger manufacturing task. For example, for a larger goal of assembling a product, a first task may be defined as providing a tool or part to a human worker assembling the product at a particular point in an assembly process. Accordingly, the at least one input data set may include data regarding an objective of the first task, a reference point (e.g., reference point 310 or reference point 320) associated with the first task, a tool or part associated with the first task, image data associated with the work area and the human operator (or worker), personal (historical) data associated with a particular human operator, or other task data relevant to defining and/or generating candidate task end states (e.g., task goal candidates or candidate robotic task targets). For example, referring to FIGS. 5 and 7, the apparatus (e.g., the robot task controller 108, the detection module 115, and/or the goal planning module 120) may capture images at step 500 and perform object recognition at step 510 or may receive task data as depicted in FIG. 7.

At 1720, the apparatus may generate, for a cooperative robotic device, a plurality of candidate task end states associated with the first task. In some aspects, the candidate task end states may be associated with a target area candidate and a state of the cooperative robotic device (e.g., a state of an end-effector of the cooperative robotic device). For example, each candidate task end state for the first task may be associated with a target location for placing an object held by the cooperative robotic device (e.g., a target location and an open/release state of a component of the cooperative robotic device holding the object). For example, referring to FIGS. 5, 7, and 9, the apparatus (e.g., the robot task controller 108, the goal planning module 120, and/or the target candidate detection module 122) may output, at step 520, candidate task end states (task goal candidates) such as candidate task end states 300, 301, 302, and 303 to which the robot may move.

After generating the plurality of candidate task end states at 1720, in some aspect, the apparatus may, at 1730, generate (e.g., calculate or compute) a score for each of the plurality of candidate task end states associated with the first task. In some aspects, the score for each of the candidate task end states associated with the first task may be generated based on a reference point and a set of distances or other characteristics. For example, referring to FIGS. 5 and 7-9, the apparatus (e.g., the robot task controller 108, the goal planning module 120, and/or the distance score calculation module 123) may calculate in association with step 520 (e.g., steps 523-1205) scores associated with each of the generated candidate task end states (task goal candidates) such as candidate task end states 300, 301, 302, and 303 to which the robot may move.

At 1740, the apparatus may select, for the cooperative robotic device, a first task end state from the plurality of candidate task end states. The first task end state, in some aspects, may be associated with a first target location for placing an object held by the cooperative robotic device. In some aspects, selecting the first task end state at 1740, may include selecting the first task end state associated with a best score, where a best score may be a lowest score or a highest score depending on the method used to generate (or calculate) the score at 1730. For example, referring to FIGS. 5 and 7-9, the apparatus (e.g., the robot task controller 108, the motion planning module 130, the score evaluation module 131, and/or the path planning module 132) may, at step 530, select (or extract) the task end state (or task goal) with the highest score among the candidate task end states (e.g., candidate task end states 300, 301, 302, and 303 or task goal candidates) output by the goal planning module 120 at step 520 (e.g., step 526).

At 1750, the apparatus may receive load data regarding a load experienced by the cooperative robotic device. The load data, in some aspects, may include magnitude data and direction data associated with the load experienced by the cooperative robotic device. In some aspects, the magnitude data and the direction data may be associated with one pattern of a plurality of patterns (e.g., the magnitude and direction patterns discussed in relation to FIG. 15). Each of the plurality of patterns, in some aspects, may be associated with at least one value associated with a corresponding at least one of the plurality of candidate task end states. The at least one value, in some aspects, may be a value to be added or subtracted from a score or a value by which to multiply or divide a score associated with the corresponding at least one of the plurality of candidate task end states. For example, referring to FIGS. 5 and 10-12, the apparatus (e.g., the robot task controller 108, the load estimation module 160, and/or the load vector calculation module 161) may, at step 560, collect and/or receive sensor data regarding the robotic device 101 (such as sensor data reflecting one of the force vectors illustrated in FIG. 12) obtained by the robotic device controller 107.

The apparatus may, at 1750, additionally, or alternatively, receive at least one additional input data set including updated environmental data regarding at least one of the work area and/or the human operator associated with the first task (and the plurality of candidate task end states). The additional input data set may include data regarding a change to a position and/or orientation of the human operator or to one or more objects (e.g., a product to be assembled, a tool, a part, etc.) on the work area. The additional input data set may be used to update one or more locations (e.g., reference points) associated with a score generation and/or calculation. For example, if a score is based on, at least in part, on a distance between a target area associated with a candidate task end state and one of a location of a right shoulder of a human worker or a position of a component of a product to be assembled (e.g., a point on the product at which a current part is to be attached or a current tool is to be used), the location used for subsequent score calculations may be based on the updated location indicated and/or included in the additional input data set.

At 1760, the apparatus may generate, based on the load data, an updated score for each of the plurality of candidate task end states associated with the first task. In some aspects, generating the updated score at 1760, may be based on the at least one value associated with the load data (e.g., the magnitude and direction data associated with a pattern of the plurality of patterns). In some aspects, the apparatus may generate the updated score at 1760 based on the additional input data set (e.g., based on the updated locations associated with the score calculation and indicated and/or included in the additional input data set). For example, referring to FIGS. 5 and 10-12, the apparatus (e.g., the robot task controller 108, the load estimation module 160, and/or the load score calculation module 162) may, at step 560 (e.g., via steps 565 to 568), generate (and output) the modified score values for each candidate task end state and the modified state of the candidate task end states (task goal candidates) to the motion planning module 130 as goal modification values before returning to step 530.

At 1770, the apparatus may select, based on the load data, a second task end state from the plurality of candidate task end states. In some aspects, the second task end state may be associated with a second target location for placing the object. The second task end state, in some aspects, may be associated with releasing the object at a current location. To select the second task end state at 1770, in some aspects, the apparatus may select the second task end state associated with a best updated score (after receiving the load data at 1750 and generating updated scores at 1760). For example, referring to FIGS. 5 and 7-9, the apparatus (e.g., the robot task controller 108, the motion planning module 130, the score evaluation module 131, and/or the path planning module 132) may return to step 530 to select (or extract) the task end state (task goal) with the highest updated (or current) score among the candidate task end states 300, 301, 302, and 303 (or task goal candidates) output by the goal planning module 120 at step 520 (e.g., step 526).

As discussed above, example implementations described herein involve an innovative cooperative robotic (or robot) system to perform, and a method to provide, highly efficient cooperative work between the cooperative robotic system and a cooperative operator by appropriately responding to the actions of the cooperative operator (e.g., a human worker) and continuing the cooperative work without interruption. The proposed system, in some aspects, improves the efficiency of cooperative work by changing a task goal according to changing conditions (e.g., the direction of the load applied to the robot) when a worker and a robot perform cooperative work while moving simultaneously, so that the worker can behave without interrupting the work and without the cooperative robotic system becoming an obstacle for the cooperative operator and/or worker. Example implementations discussed herein may improves the efficiency of cooperative work by setting multiple work targets for the robot in advance and changing the work targets without interrupting the operation. Additionally, in some aspects, setting the robot's task goal based on reference points and detection results according to the work content allows the example implementations to optimize each task in a process in which multiple tasks are performed. The system, in some aspects of the disclosure, may achieve efficient operation for each task and streamline the work of processes that span multiple processes.

Figure 18:
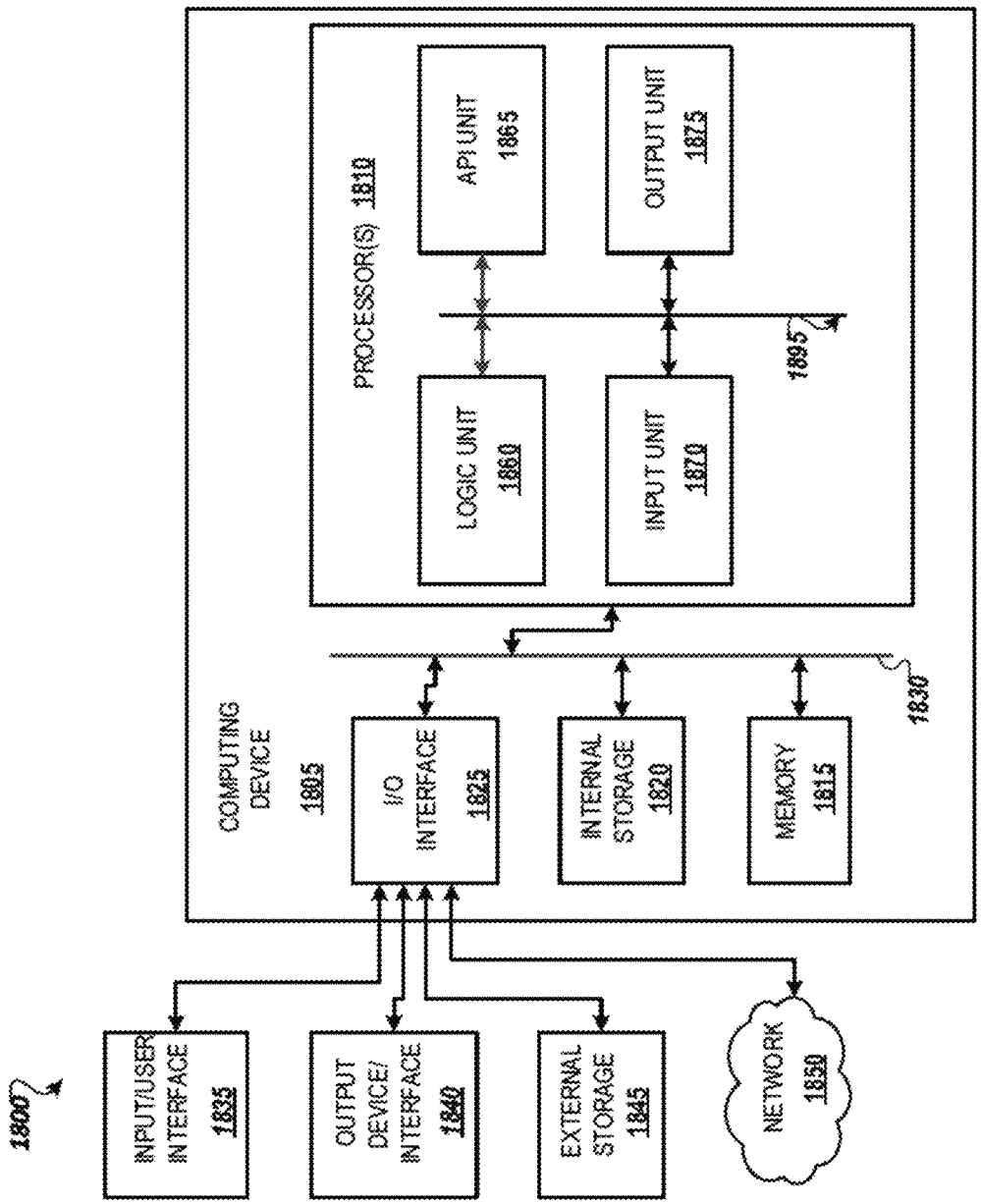
FIG. 18 illustrates an example computing environment with an example computer device suitable for use in some example implementations.

FIG. 18 illustrates an example computing environment with an example computer device suitable for use in some example implementations. Computer device 1805 in computing environment 1800 can include one or more processing units, cores, or processor(s) 1810, memory 1815 (e.g., RAM, ROM, and/or the like), internal storage 1820 (e.g., magnetic, optical, solid-state storage, and/or organic), and/or IO interface 1825, any of which can be coupled on a communication mechanism or bus 1830 for communicating information or embedded in the computer device 1805. IO interface 1825 is also configured to receive images from cameras or provide images to projectors or displays, depending on the desired implementation.

Computer device 1805 can be communicatively coupled to input/user interface 1835 and output device/interface 1840. Either one or both of the input/user interface 1835 and output device/interface 1840 can be a wired or wireless interface and can be detachable. Input/user interface 1835 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1840 may include a display, television, monitor, printer, speaker, braille, or the like. In some example implementations, input/user interface 1835 and output device/interface 1840 can be embedded with or physically coupled to the computer device 1805. In other example implementations, other computer devices may function as or provide the functions of input/user interface 1835 and output device/interface 1840 for a computer device 1805.

Examples of computer device 1805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1805 can be communicatively coupled (e.g., via IO interface 1825) to external storage 1845 and network 1850 for communicating with any number of networked components, devices, and systems, including one or more computer devices of the same or different configuration. Computer device 1805 or any connected computer device can be functioning as, providing services of, or referred to as a server, client, thin server, general machine, special-purpose machine, or another label.

IO interface 1825 can include but is not limited to, wired and/or wireless interfaces using any communication or IO protocols or standards (e.g., Ethernet, 1802.11x, Universal System Bus, WiMax, modem, a cellular network protocol, and the like) for communicating information to and/or from at least all the connected components, devices, and network in computing environment 1800. Network 1850 can be any network or combination of networks (e.g., the Internet, local area network, wide area network, a telephonic network, a cellular network, satellite network, and the like).

Computer device 1805 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1810 can individually, or in any combination, execute under any operating system (OS) (not shown), in a native or virtual environment. One or more applications can be deployed that include logic unit 1860, application programming interface (API) unit 1865, input unit 1870, output unit 1875, and inter-unit communication mechanism 1895 for the different units to communicate with each other, with the OS, and with other applications (not shown). The described units and elements can be varied in design, function, configuration, or implementation and are not limited to the descriptions provided. Processor(s) 1810 can be in the form of hardware processors such as central processing units (CPUs) or in a combination of hardware and software units.

In some example implementations, when information or an execution instruction is received by API unit 1865, it may be communicated to one or more other units (e.g., logic unit 1860, input unit 1870, output unit 1875). In some instances, logic unit 1860 may be configured to control the information flow among the units and direct the services provided by API unit 1865, the input unit 1870, the output unit 1875, in some example implementations described above. For example, the flow of one or more processes or implementations may be controlled by logic unit 1860 alone or in conjunction with API unit 1865. The input unit 1870 may be configured to obtain input for the calculations described in the example implementations, and the output unit 1875 may be configured to provide an output based on the calculations described in example implementations.

Processor(s) 1810 individually, or in any combination, can be configured to generate, for a cooperative robotic device, a plurality of candidate task end states associated with a first task. The processor(s) 1810 individually, or in any combination, can be configured to select, for the cooperative robotic device, a first task end state from the plurality of candidate task end states. The processor(s) 1810 individually, or in any combination, can be configured to receive load data regarding a load experienced by the cooperative robotic device. The processor(s) 1810 individually, or in any combination, can be configured to select, based on the load data, a second task end state from the plurality of candidate task end states.

The processor(s) 1810 individually, or in any combination, can also be configured to generate a score for each of the plurality of candidate task end states associated with the first task. The processor(s) 1810 individually, or in any combination, can also be configured to select the first task end state associated with a best score. The processor(s) 1810 individually, or in any combination, can also be configured to generate, based on the load data, an updated score for each of the plurality of candidate task end states associated with the first task. The processor(s) 1810 individually, or in any combination, can also be configured to select the second task end state associated with a best updated score. The processor(s) 1810 individually, or in any combination, can also be configured to generate the updated score based on the at least one value associated with the one pattern. The processor(s) 1810 individually, or in any combination, can also be configured to receive at least one input data set comprising one or more of task data regarding a task associated with the plurality of candidate task end states or environmental data regarding at least a work area and a human operator. The processor(s) 1810 individually, or in any combination, can also be configured to generate the plurality of candidate task end states based on a first input data set of the at least one input data set.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A control system comprising:
   at least one memory; and
   at least one processor coupled to the at least one memory and, based at least in part on information stored in the at least one memory, the at least one processor, individually or in any combination, is configured to:
   generate, for a cooperative robotic device, a plurality of candidate task end states associated with a first task;
   generate a score for each of the plurality of candidate task end states associated with the first task;
   select, for the cooperative robotic device, a first task end state from the plurality of candidate task end states;
   receive, from the cooperative robotic device, load data regarding a load experienced by the cooperative robotic device, wherein the load data is associated with a first pattern of a plurality of patterns, wherein each of the plurality of patterns is associated with a set of one or more values for a corresponding set of one or more candidate task end states of the plurality of candidate task end states;
   generate, based on a first set of one or more values associated with the first pattern, an updated score for a first corresponding set of one or more candidate task end states;
   select, based on the updated score for at least the first corresponding set of one or more candidate task end states, a second task end state from the plurality of candidate task end states; and
   output, to the cooperative robotic device based on the second task end state, a set of instructions for the cooperative robotic device to execute a set of motion commands associated with the second task end state.

2. The control system of claim 1,
   wherein to select the first task end state, the at least one processor is configured to select the first task end state associated with a best score.

3. The control system of claim 2,
   wherein to select the second task end state, the at least one processor is configured to select the second task end state associated with a best updated score.

4. The control system of claim 3, wherein the load data comprises magnitude data and direction data associated with the load experienced by the cooperative robotic device.

5. The control system of claim 4, wherein the first corresponding set of one or more candidate task end states comprises two or more candidate task end states.

6. The control system of claim 2, wherein the first task end state is associated with a first target location for placing an object held by the cooperative robotic device.

7. The control system of claim 6, wherein the second task end state is associated with a second target location for placing the object.

8. The control system of claim 6, wherein the second task end state is associated with releasing the object at a current location of the object.

9. The control system of claim 1, wherein the at least one processor is further configured to:
   receive one or more input data sets comprising one or more of task data regarding a task associated with the plurality of candidate task end states or environmental data regarding at least a work area and a human operator.

10. The control system of claim 9, wherein, to generate the plurality of candidate task end states, the at least one processor is configured to:
    generate the plurality of candidate task end states based on a first input data set of the one or more input data sets.

11. The control system of claim 10, wherein the environmental data comprises image data associated with the work area and the human operator and wherein, to select the second task end state from the plurality of candidate task end states, the at least one processor is further configured to select the second task end state based on a second input data set of the one or more input data sets, wherein the second input data set comprises the environmental data.

12. A method of controlling a cooperative robotic device comprising:
- generating, for the cooperative robotic device, a plurality of candidate task end states associated with a first task;
- generating a score for each of the plurality of candidate task end states associated with the first task;
- selecting, for the cooperative robotic device, a first task end state from the plurality of candidate task end states;
- receiving, from the cooperative robotic device, load data regarding a load experienced by the cooperative robotic device, wherein the load data is associated with a first pattern of a plurality of patterns, wherein each of the plurality of patterns is associated with a set of one or more values for a corresponding set of one or more candidate task end states of the plurality of candidate task end states;
- generating, based on a first set of one or more values associated with the first pattern, an updated score for a first corresponding set of one or more candidate task end states;
- selecting, based on the updated score for at least the first corresponding set of one or more candidate task end states, a second task end state from the plurality of candidate task end states; and
- outputting, to the cooperative robotic device based on the second task end state, a set of instructions for the cooperative robotic device to execute a set of motion commands associated with the second task end state.

13. The method of claim 12, wherein selecting the first task end state comprises selecting the first task end state associated with a best score.

14. The method of claim 13, wherein selecting the second task end state comprises selecting the second task end state associated with a best updated score.

15. The method of claim 14, wherein the load data comprises magnitude data and direction data associated with the load experienced by the cooperative robotic device, and wherein the first corresponding set of one or more candidate task end states comprises two or more candidate task end states.

16. The method of claim 13, wherein the first task end state is associated with a first target location for placing an object held by the cooperative robotic device and wherein the second task end state is associated with a second target location for placing the object.

17. The method of claim 16, wherein the second target location for placing the object is a current location of the object, and wherein the second task end state is associated with releasing the object at a current location of the object.

18. The method of claim 12, further comprising:
- receiving one or more input data sets comprising one or more of task data regarding a task associated with the plurality of candidate task end states or environmental data regarding at least a work area and a human operator, wherein generating the plurality of candidate task end states is further based on a first input data set of the one or more input data sets.

19. The method of claim 18, wherein the environmental data comprises image data associated with the work area and the human operator and wherein selecting the second task end state from the plurality of candidate task end states is further based on a second input data set of the one or more input data sets, wherein the second input data set comprises the environmental data.

20. The control system of claim 1, wherein the first set of one or more values associated with the first pattern comprises one or more of:
- a first value to be added to a first score of a first candidate task end state in the first corresponding set of one or more candidate task end states;
- a second value to be subtracted from a second score of a second candidate task end state in the first corresponding set of one or more candidate task end states;
- a third value by which to multiply a third score of a third candidate task end state in the first corresponding set of one or more candidate task end states; or
- a fourth value by which to divide a fourth score of a fourth candidate task end state in the first corresponding set of one or more candidate task end states.

* * * * *